(12) United States Patent
Kim

(10) Patent No.: US 12,244,548 B2
(45) Date of Patent: Mar. 4, 2025

(54) METHOD AND SYSTEM FOR EVALUATING CONTENT ON INSTANT MESSAGING APPLICATION

(71) Applicant: LINE Plus Corporation, Seongnam-si (KR)

(72) Inventor: Gye Yeong Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 36 days.

(21) Appl. No.: 17/180,055

(22) Filed: Feb. 19, 2021

(65) Prior Publication Data

US 2021/0266275 A1  Aug. 26, 2021

(30) Foreign Application Priority Data

Feb. 20, 2020  (KR) .................. 10-2020-0021271

(51) Int. Cl.
| | | |
|---|---|---|
| H04L 51/046 | (2022.01) | |
| G06F 3/0482 | (2013.01) | |
| G06F 3/14 | (2006.01) | |
| G06F 40/279 | (2020.01) | |
| G06Q 30/0601 | (2023.01) | |
| G07C 13/00 | (2006.01) | |
| H04L 67/306 | (2022.01) | |
| H04N 7/15 | (2006.01) | |

(52) U.S. Cl.
CPC .......... *H04L 51/046* (2013.01); *G06F 3/0482* (2013.01); *G06F 3/1454* (2013.01); *G06F 40/279* (2020.01); *G06Q 30/0641* (2013.01); *G07C 13/00* (2013.01); *H04L 67/306* (2013.01); *H04N 7/15* (2013.01)

(58) Field of Classification Search
CPC ....................................................... H04L 51/04
See application file for complete search history.

(56) References Cited

U.S. PATENT DOCUMENTS

| | | | |
|---|---|---|---|
| 9,491,260 B2 | 11/2016 | Thorsander et al. | |
| 10,496,354 B2 | 12/2019 | Koike | |
| 10,958,600 B1* | 3/2021 | Annadata | ............... H04L 51/02 |
| 11,068,120 B2* | 7/2021 | Aggarwal | ............. H04L 67/131 |

(Continued)

FOREIGN PATENT DOCUMENTS

| | | |
|---|---|---|
| JP | 2012-527702 A | 11/2012 |
| KR | 10-2002-0032497 A | 5/2002 |

(Continued)

OTHER PUBLICATIONS

Japanese Office Action 2021-024171 dated Oct. 1, 2024.

*Primary Examiner* — Adam M Queler
*Assistant Examiner* — Nathan K Shrewsbury
(74) *Attorney, Agent, or Firm* — Sughrue Mion, PLLC

(57) ABSTRACT

A method for evaluating a content through an instant messaging application is provided. The method includes: sharing a screen of a user terminal associated with a first user account, through a chat room of the instant messaging application in which a plurality of user accounts including the first user account participate; selecting at least one content that is included in the shared screen; outputting the selected at least one content through the chat room; and receiving, through the chat room, an evaluation of the at least one content from at least one user account among the plurality of user accounts.

18 Claims, 12 Drawing Sheets

(56) References Cited

U.S. PATENT DOCUMENTS

| | | | |
|---|---|---|---|
| 11,501,325 B2* | 11/2022 | Kalin | G06Q 30/0222 |
| 2004/0141005 A1* | 7/2004 | Banatwala | H04L 12/1813 |
| | | | 715/751 |
| 2005/0027612 A1* | 2/2005 | Walker | G06Q 30/06 |
| | | | 705/26.7 |
| 2006/0122895 A1* | 6/2006 | Abraham | G06Q 30/02 |
| | | | 705/26.8 |
| 2007/0198744 A1* | 8/2007 | Wensley | H04L 65/4053 |
| | | | 709/248 |
| 2008/0183819 A1* | 7/2008 | Gould | G06Q 10/10 |
| | | | 705/26.1 |
| 2009/0177695 A1* | 7/2009 | Mahajan | G06Q 30/02 |
| 2010/0017307 A1* | 1/2010 | Barbour | G06Q 99/00 |
| | | | 705/26.1 |
| 2010/0070899 A1 | 3/2010 | Hunt et al. | |
| 2010/0299616 A1* | 11/2010 | Chen | G06Q 30/0601 |
| | | | 715/753 |
| 2012/0158544 A1* | 6/2012 | Nations | G06Q 30/0623 |
| | | | 283/67 |
| 2012/0185355 A1* | 7/2012 | Kilroy | G06Q 30/0633 |
| | | | 705/26.8 |
| 2012/0265635 A1* | 10/2012 | Forsblom | G06Q 50/01 |
| | | | 705/26.7 |
| 2013/0054328 A1* | 2/2013 | Chavie | G06Q 30/06 |
| | | | 705/14.23 |
| 2013/0132221 A1* | 5/2013 | Bradford | G06Q 30/06 |
| | | | 705/26.1 |
| 2013/0218949 A1* | 8/2013 | Jakobson | G06Q 50/01 |
| | | | 709/203 |
| 2013/0249937 A1* | 9/2013 | Amacker | G06F 3/017 |
| | | | 345/619 |
| 2013/0254648 A1* | 9/2013 | Amacker | G06F 3/017 |
| | | | 715/234 |
| 2013/0296046 A1* | 11/2013 | Mianji | A63F 13/00 |
| | | | 463/31 |
| 2013/0325987 A1 | 12/2013 | Lee et al. | |
| 2014/0176565 A1* | 6/2014 | Adeyoola | G06F 3/04817 |
| | | | 345/473 |
| 2014/0351082 A1* | 11/2014 | Lowinger | G06Q 30/0633 |
| | | | 705/26.8 |
| 2015/0033149 A1* | 1/2015 | Kuchoor | H04N 21/4782 |
| | | | 715/753 |
| 2015/0058238 A1* | 2/2015 | Milley | H04W 4/21 |
| | | | 705/319 |
| 2015/0149565 A1* | 5/2015 | Ahmed | H04L 65/401 |
| | | | 709/204 |
| 2015/0254748 A1* | 9/2015 | Gao | G06Q 30/0605 |
| | | | 705/26.44 |
| 2015/0286829 A1* | 10/2015 | Amacker | G06Q 30/0601 |
| | | | 726/27 |
| 2015/0324878 A1* | 11/2015 | Shorter | G06Q 30/0633 |
| | | | 705/26.2 |
| 2015/0334075 A1* | 11/2015 | Wang | H04L 51/04 |
| | | | 715/752 |
| 2016/0065633 A1 | 3/2016 | Kawakubo | |
| 2016/0125507 A1* | 5/2016 | Bueno Lobl | G06Q 30/0613 |
| | | | 705/26.41 |
| 2016/0127287 A1 | 5/2016 | Oh et al. | |
| 2016/0147400 A1 | 5/2016 | Patten | |
| 2016/0203831 A1* | 7/2016 | Elyashiv | G06Q 10/101 |
| | | | 704/270 |
| 2016/0210602 A1* | 7/2016 | Siddique | G06Q 20/321 |
| 2017/0004515 A1* | 1/2017 | Wilmot | G06Q 30/0203 |
| 2018/0048690 A1* | 2/2018 | Song | H04L 65/1059 |
| 2018/0088784 A1 | 3/2018 | Zhu et al. | |
| 2019/0303414 A1* | 10/2019 | Cypher | G06Q 30/0261 |
| 2021/0266275 A1* | 8/2021 | Kim | H04L 51/04 |
| 2021/0336912 A1* | 10/2021 | Ahn | H04N 7/147 |
| 2021/0409354 A1* | 12/2021 | Jang | H04L 51/52 |

FOREIGN PATENT DOCUMENTS

| | | |
|---|---|---|
| KR | 10-2008-0029463 A | 4/2008 |
| KR | 10-1331444 B1 | 11/2013 |
| KR | 10-2013-0136818 A | 12/2013 |
| KR | 10-2018-0092015 A | 8/2018 |

* cited by examiner

METHOD AND SYSTEM FOR EVALUATING CONTENT ON INSTANT MESSAGING APPLICATION

CROSS-REFERENCE TO RELATED APPLICATION

This application claims priority from Korean Patent Application No. 10-2020-0021271, filed in the Korean Intellectual Property Office on Feb. 20, 2020, the disclosure of which is incorporated herein by reference in its entirety.

TECHNICAL FIELD

Apparatuses and methods consistent with example embodiments relate to evaluating or conducting a survey on a content through an instant messaging application, and specifically, to sharing a screen associated with a user account of an instant messaging application in a chat room, and receiving a result of the evaluation or the survey through the chat room.

BACKGROUND

Along with the widespread distribution of mobile devices such as smartphones, or the like and the development of the Internet, instant messaging applications have been widely used, and users may communicate and share their opinions with each other through the instant messaging applications. Users are constantly encountered with the situations where they need to make decisions in various fields of daily lives, and may want to receive the opinions of their acquaintances about choices so that they could make rational decisions. Accordingly, users may wish to create a survey to find out other user's preferences and opinions on a specific topic or content, through the instant messaging applications.

In the conventional instant messaging application, when a member of a group in the chat room wants to share a certain content and have the evaluation thereon, he or she has to exit the chat room to manipulate another application or a messaging application and share the content in the chat room in the form of an image or file. Accordingly, after the user opens a new content from the outside of the chat room and shares it in the chat room, in order to add another evaluation target, the user has the inconvenience of having to open a new content from the outside of the chat room and share it again. Under this environment, the number of contents to be evaluated may be limited. In addition, the users of such instant messaging applications simply communicate their opinions on shared content through texts or voices, which limits the ability to deliver the opinions of multiple users effectively. In addition, in order to use the voting list generation service provided by the conventional instant messaging application, there is an inconvenience in that the user has to directly input the voting list. Accordingly, for the users who want to receive evaluations of the content they are interested in through the service provided by a conventional instant messaging application, the inconveniences in using the service may increase as the number of people or the number of contents in the chat room increases.

SUMMARY

One or more exemplary embodiments provides a method, a non-transitory computer-readable storage medium, and a system for evaluating a content through a chat room.

According to an aspect of an exemplary embodiment, there is provided a method for evaluating a content through an instant messaging application performed by at least one processor, the method including: sharing a screen of a user terminal associated with a first user account, through a chat room of the instant messaging application in which a plurality of user accounts comprising the first user account participate: selecting at least one content that is included in the shared screen; outputting the selected at least one content through the chat room; and receiving, through the chat room, an evaluation of the at least one content from at least one user account among the plurality of user accounts.

The selecting the at least one content may include: receiving an input that selects the at least one content from among a plurality of contents included in the shared screen; and extracting the at least one content based on a position of the input on the shared screen.

The receiving the input may include: receiving the input from the at least one user account among the plurality of user accounts that participate in the chat room.

The outputting the selected at least one content through the chat room may include: collecting information associated with the selected at least one content; and outputting the selected at least one content and the collected information associated with the at least one content together.

The shared screen may be a first shared screen, and the selected at least one content may be a first content included in the first shared screen, and the outputting the selected at least one content through the chat room may include outputting the first content and the information associated with the first content together.

The receiving the evaluation of the at least one content may include receiving, from the at least one user account, an input indicative of preferences of the plurality of user accounts for the first content over one or more other contents included in the shared screen.

The selecting the at least one content that is included in the shared screen may include selecting a second content included in a second shared screen that is displayed through the chat room subsequent to the first shared screen, and the outputting the selected at least one content through the chat room may include outputting the selected second content and the information associated with the second content together.

The receiving the evaluation of the at least one content may include receiving, from the at least one user account, an input indicative of preferences of the plurality of user accounts for at least one of the first content or the second content over one or more other contents included in the shared screen.

The collecting the information associated with the selected at least one content may include recognizing a text associated with the at least one content on the shared screen.

The collecting the information associated with the selected at least one content comprises searching for the information associated with the at least one content using the selected at least one content on a network.

The sharing the screen may include: receiving an input indicative of the screen sharing by the first user account in the chat room; and displaying the screen associated with the first user account in at least a portion of the chat room.

The sharing the screen may include sharing a video that is captured by a camera of the user terminal, through the chat room, during a video call between the plurality of user accounts.

The outputting the selected at least one content through the chat room may include: when a plurality of contents are selected on the shared screen, automatically generating an evaluation candidate list including the selected plurality of contents; and sharing the generated evaluation candidate list through the chat room.

The method may further include: selecting one or more contents from among the plurality of contents included in the evaluation candidate list; and generating a final evaluation candidate list comprising the selected one or more contents, wherein the sharing the generated evaluation candidate list through the chat room comprises sharing the final evaluation candidate list in the chat room.

The receiving the evaluation of the at least one content may include receiving a voting result for the plurality of contents included in the evaluation candidate list shared in the chat room, and the method for evaluating the content may further include sharing the voting result for the plurality of contents through the chat room.

The sharing the generated evaluation candidate list through the chat room may include providing to the plurality of user accounts included in the chat room through a link associated with the chat room.

The method may further include providing an evaluation history including evaluations of the selected at least one content and the received at least one content through the chat room.

According to an aspect of an exemplary embodiment, there is provided a non-transitory computer-readable recording medium storing instructions for executing the method for evaluating the content.

According to an aspect of another exemplary embodiment, there is provided a system for evaluating a content through an instant messaging application, including: a communication interface: a memory configured to store computer readable instructions; and at least one processor configured to execute the computer readable instructions to: control the communication interface to share a screen of a user terminal associated with a first user account, through a chat room of the instant messaging application in which a plurality of user accounts comprising the first user account participate: select at least one content that is included in the shared screen and output the selected at least one content through the chat room; and control the communication interface to receive, from at least one user account, an evaluation of the at least one content among the plurality of user accounts.

The at least one processor may be further configured to collect information associated with the selected at least one content, and output the selected at least one content and the collected information associated with the at least one content together.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
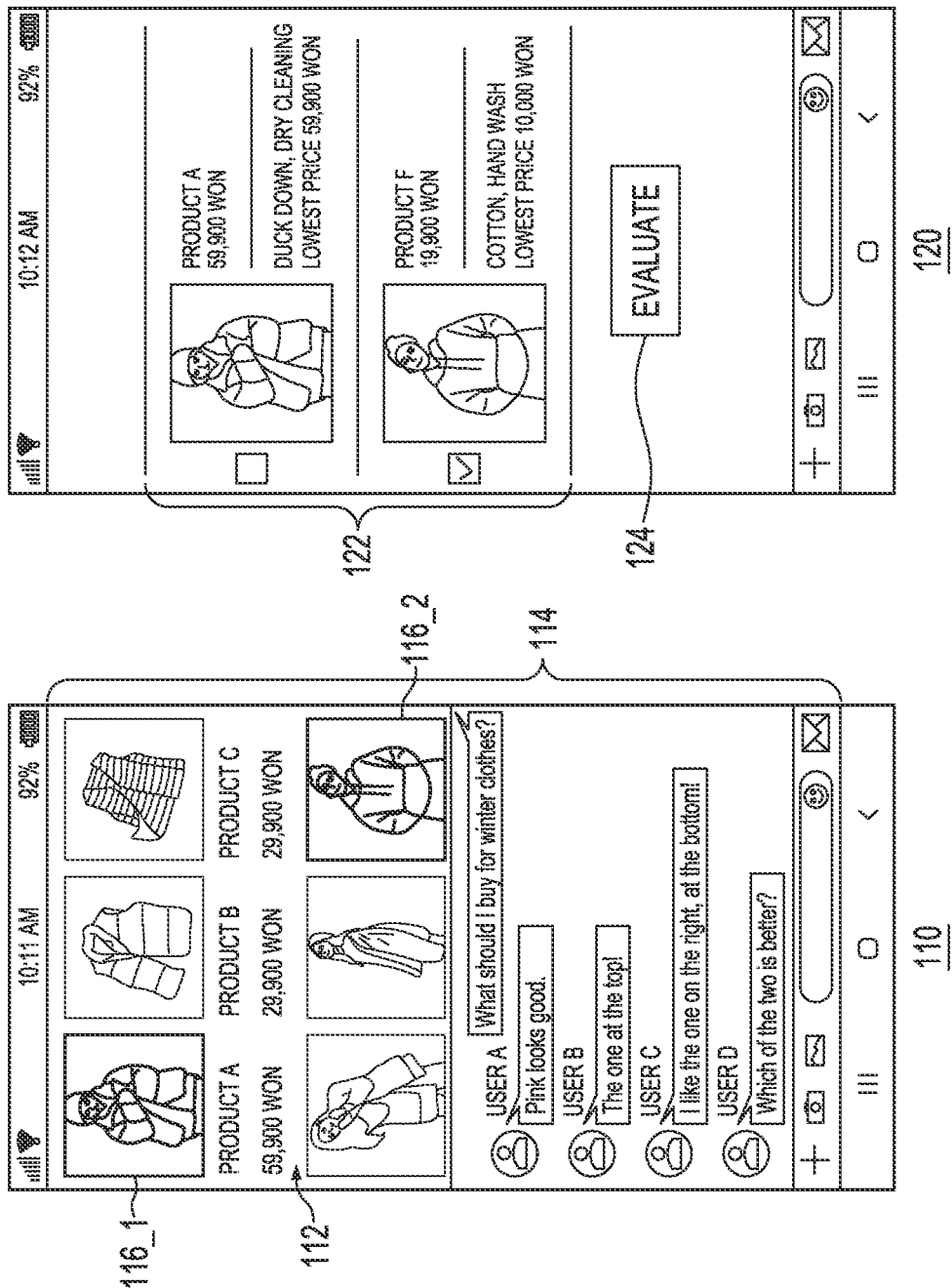
FIG. 1 is an exemplary diagram illustrating an operation of evaluating content included in a screen shared in a chat room, in the process of evaluating the content through an instant messaging application according to an exemplary embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Further, the term "module" or "unit" used herein refers to a software or hardware component, and "module" or "unit' performs certain roles. However, the meaning of the "module" or "unit" is not limited to software or hardware. The "module" or "unit" may be configured to be in an addressable storage medium or configured to execute at least one processor. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an exemplary embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

As used herein, the "chat room" may refer to a virtual space or group which may be generated in an instant messaging application installed on a computing device, and which may be participated by one or more users (or user accounts). For example, one or more user accounts may participate in or be included in the chat room and exchange various types of messages, files, and the like. In addition, in the chat room, Voice over Internet Protocol (VOIP) call function, VOIP group call function, and live broadcast function (VOIP real-time video transmission function) are provided, enabling voice calls, video calls, video streaming, and the like to be performed between user accounts in the chat room. In addition, the chat room may include a link (e.g., in the form of an icon or button) associated with the chat room. For example, the chat room is a link associated with the chat room of the instant messaging application, and includes a bulletin board, a file, a gallery, a menu, a vote, an evaluation, a shopping cart, a View More, a setting, a user profile, and the like.

As used herein, the "user account" may represent an account generated and used by a user in the instant messaging application or data related thereto. In addition, the user account of the instant messaging application may refer to a user who uses the instant messaging application. Likewise, a user who uses instant messaging or a chat room capable of instant messaging may refer to the user account of the instant messaging application. Further, the user account may include one or more user accounts. In addition, while the user account and the first user account are used separately herein, the user account may refer to the first user account, and conversely, the first user account may refer to the user account. In addition, the first user account may be included in a plurality of user accounts.

As used herein, the "content" may include various types of information or contents such as images, texts, videos, and voices that are produced in a digital manner that can be recognized by human senses and provided to the user. In addition, the content may include information on which user preferences may be generated. For example, the content may include product content, movie content, food content, place content, person content, work content, time content, job content, and the like, but is not limited thereto. In addition, while the content, the first content, and the second content are used separately, the content may refer to the first content and/or the second content, and conversely, the first content and/or the second content may refer to the content. Each of the content, the first content, and the second content may include one or more contents.

As used herein, the "list" may refer to a series of contents and/or information associated with the contents arranged in a certain order. In addition, while an evaluation candidate list and a final evaluation candidate list are used separately, the evaluation candidate list may refer to the final evaluation candidate list, and conversely, the final evaluation candidate list may refer to the evaluation candidate list.

As used herein, the "screen" may include at least one image or video continuing in time, and further include audio. The screen may refer to a first screen and/or a second screens, and conversely, the first screen and/or the second screen may refer to the screen.

As used herein, the "screen associated with the user account" may refer to a screen of any application running on a user terminal in which the user account is operated, a screen input through any application, a screen of any application that may be displayed on the user terminal, and the like. For example, the user terminal may refer to a user terminal on which an instant messaging application to which the user account is logged in is operated. The screen may be shared in a chat room including the user account according to a request to share made by the user account.

As used herein, "voting" may refer to a method for a user to select at least one content that is included in the evaluation candidate list. For example, voting may refer to a user's opinion, evaluation, and the like, which may be expressed by selecting at least some contents from among a plurality of contents included in the list. In addition, a result of voting may be processed and presented or provided as an evaluation history. For example, the result of voting or the evaluation history may include the most selected result, the least selected result, the ranking result, and the like, but is not limited thereto.

As used herein, the term "on a network" or "in a network" may refer to a state where search or access is possible through any electronic device capable of wired/wireless communication. For example, the meaning of "on a network" or "in network" may indicate a state in which any content and/or information associated therewith stored in any device connected to any electronic device by wired or wirelessly can be searched or accessed.

FIG. 1 is an exemplary diagram illustrating an operation of evaluating content included in a screen 112 shared in a chat room 114, in the process of evaluating the content through an instant messaging application according to an exemplary embodiment. A plurality of user accounts or users of the instant messaging application may be included or participating in a chat room of the instant messaging application. In an exemplary embodiment, as illustrated in operation 110, a plurality of user accounts are participating in a chat room 114, and are able to exchange text messages with each other through the chat room 114. For example, the plurality of user accounts may include a first user account, a user account A, a user account B, a user account C, and a user account D. In an example, operation 110 may refer to an operation that is performed at the user terminal associated with the first user account (or the user terminal on which the first user account is logged in), to execute the instant messaging application and display the chat room 114.

A screen associated with the first user account may be shared in the chat room where the first user account of the instant messaging application is included. According to an embodiment, in operation 110, the first user account participating in the chat room 114 may share the screen that can be executed and displayed on its user terminal in the chat room 114. In an example, the shared screen 112 may include texts, images, videos, and the like that may be output through the chat room 114. For example, the shared screen 112 may include a web browser screen, an application screen, a video call screen, a captured image, a streaming broadcast video screen being executed in the user terminal of the first user account, a text, an image, a video stored in the user terminal, and the like, but is not limited thereto. In an exemplary embodiment, the first user account may share an application screen displaying clothing products running on its user terminal on a background screen of the chat room 114 or in a certain area of the chat room 114. In addition, a plurality of user accounts participating in the chat room 114 are able to exchange conversations related thereto through the chat window while viewing the screen shared through the chat room 114 together.

At least one user account among a plurality of user accounts participating in the chat room may select at least one content that is included in the shared screen. According to an embodiment, an input (e.g., a touch input or the like) indicative of selection of a portion corresponding to at least one content from among a plurality of contents included in the shared screen may be received. For example, the first user account may select a portion 116_1 corresponding to a product A content and a portion 116_2 corresponding to a product F content on the shared screen 112. In an exemplary embodiment, the product A content and the product F content corresponding to the selected portions on the shared screen 112 may be extracted.

At least one content selected from the shared screen may be output through the chat room. According to an embodiment, an evaluation candidate list 122 including a plurality of contents selected and extracted from the shared screen 112 may be generated, and may be shared through the chat room 114 in real time. For example, as illustrated in operation 120, the evaluation candidate list 122 including the product A content and the product F content selected and extracted from the shared screen 112 may be generated and displayed. In an example, information associated with product A content and the product F content may be extracted from the shared screen 112 or searched on a network, and included in the evaluation candidate list 122 together. In addition, in operation 120, the evaluation candidate list may be displayed in the chat room 114, or clicking or touching any link or button (not illustrated) accessible through the chat room 114 may cause the evaluation candidate list to be displayed. The evaluation candidate list 122 displayed in the second operation 120 may be accessed or displayed through a plurality of user accounts participating in the chat room 114.

At least one of the plurality of user accounts included in the chat room may evaluate at least one selected content. According to an embodiment, as illustrated in operation 120, at least one user account may access the shared evaluation candidate list 122 through the chat room 114, and evaluate at least one of a plurality of contents included in the evaluation candidate list 122. For example, at least one user account may perform a selection indicative of a preference for one content, e.g., the product F from the evaluation candidate list 122 and press or click "Evaluate" button 124 to complete the evaluation of the product F.

Figure 2:
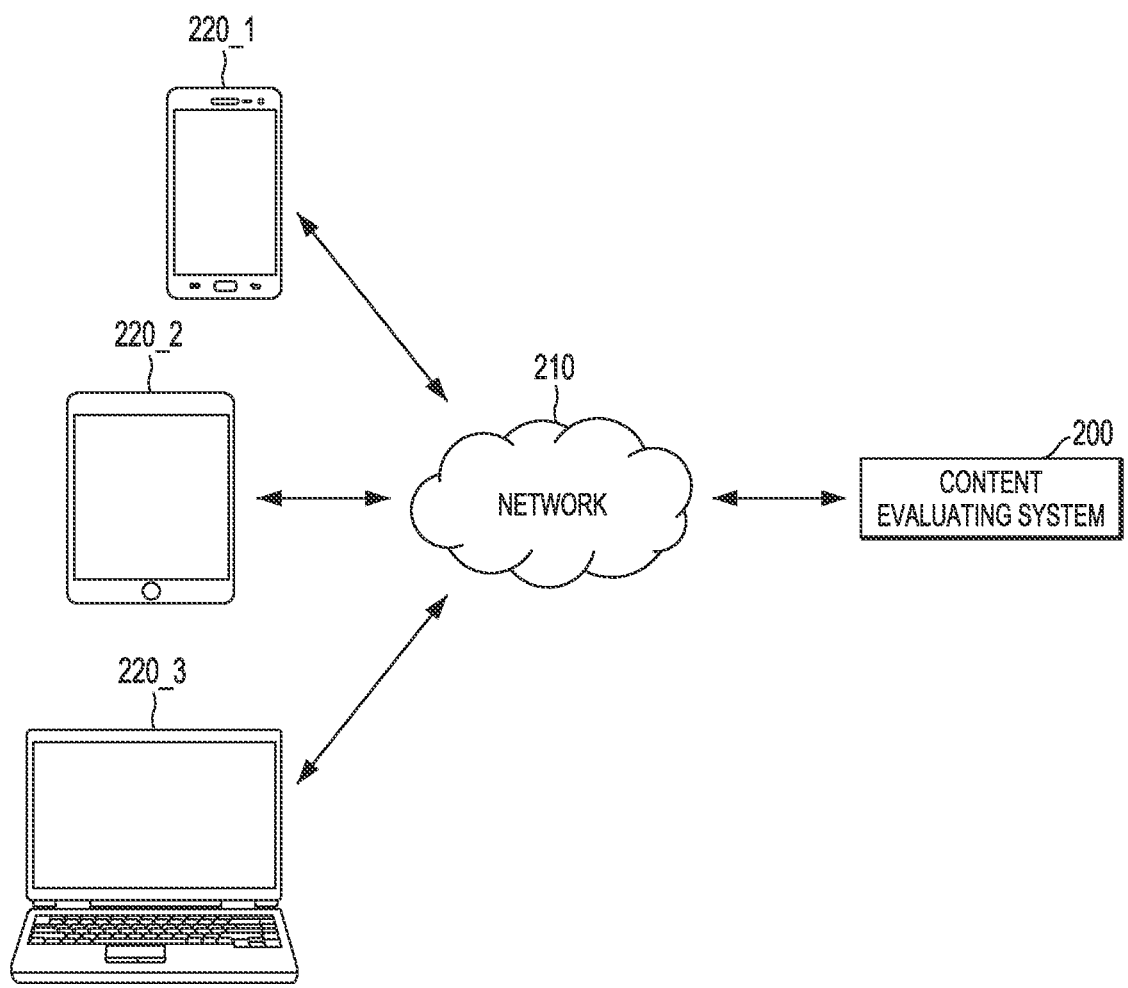
FIG. 2 is a schematic diagram illustrating a configuration in which a system for evaluating a content is communicatively connected with a plurality of user terminals in order to provide a service for evaluating a content according to an exemplary embodiment.

FIG. 2 is a schematic diagram illustrating a configuration in which a system 200 for evaluating a content is communicatively connected with a plurality of user terminals 220_1, 220_2, and 220_3 to provide a service for evaluating a content according to an exemplary embodiment. The system 200 for evaluating a content may include a system capable of providing an instant messaging service including a service for evaluating a content to a plurality of user terminals 220_1, 220_2, and 220_3 through the network 210. According to an embodiment, the system 200 for evaluating a content may include one or more server devices and/or databases capable of storing, providing and executing computer-executable programs (e.g., downloadable applications) and data associated with an instant messaging service, or one or more distributed computing devices and/or distributed databases based on cloud computing services. The instant messaging service provided by the system 200 for evaluating a content may be provided to the user through the instant messaging application installed in each of the plurality of user terminals 220_1, 220_2, and 220_3. For example, the instant messaging service may include a text messaging service, a video call service, a voice call service, a video streaming service, a screen sharing service, a service for evaluating a content, and the like between the users of the instant messaging application.

The plurality of user terminals 220_1, 220_2, and 220_3 may communicate with the system 200 for evaluating a content through the network 210. The network 210 may be configured to enable communication between the plurality of user terminals 220 and the system for evaluating a content 200. The network 210 may be configured as a wired network 210 such as Ethernet, a wired home network (Power Line Communication), a telephone line communication device and RS-serial communication, a wireless network 210 such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and the like) that may be included in the network 210 as well as short-range wireless communication between the user terminals 220_1, 220_2, and 220_3. For example, the network 210 may include any one or more of networks including a personal area network (PAN), a local area network (LAN), a campus area network (CAN), a metropolitan area network (MAN), a wide area network (WAN), a broadband network (BBN), the Internet, and the like. In addition, the network 210 may include any one or more of network topologies including a bus network, a star network, a ring network, a mesh network, a star-bus network, a tree or hierarchical network, and the like, but not limited thereto.

In FIG. 2, a mobile phone terminal 220_1, a tablet terminal 220_2, and a PC terminal 220_3 are illustrated as the examples of the user terminals, but are not limited thereto, and the user terminals 220_1, 220_2, and 220_3 may be any computing device that is capable of wired and/or wireless communication and that may be installed with the instant messaging application and execute the same. For example, the user terminal 220 may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, while FIG. 2 illustrates three user terminals 220_1, 220_2, and 220_3 in communication with the system 200 for evaluating a content through the network 210, the present disclosure is not limited thereto, and accordingly, a different number of user terminals 220_1, 220_2 and 220_3 may be configured to be in communication with the system 200 for evaluating a content through the network 210.

The system 200 for evaluating a content may provide a screen sharing service between the user terminals 220_1, 220_2, and 220_3 on which an instant messaging application is operated. According to an embodiment, the system 200 for evaluating a content may receive one or more user screens through a Voice over Internet Protocol (VOIP) channel with the user terminals 220_1, 220_2, and 220_3, and share them in real time through the instant messaging application. For example, the system 200 for evaluating a content may share a video captured by at least some of the user terminals 220_1, 220_2, and 220_3 during a video call service provided by the instant messaging application. In an example, the video call service may be provided through the chat room of the instant messaging application. As another example, the system 200 for evaluating a content may share a program or application running on one of the user terminals 220_1, 220_2, and 220_3 through the chat room of the instant messaging application. According to another embodiment, a screen received in real time from at least some of the user terminals 220_1, 220_2, and 220_3 through a broadcast channel may be shared in the chat room. In an example, the broadcast channel may be generated through any method capable of bidirectional communication. The system 200 for evaluating a content may output the shared screen to the user terminals 220_1, 220_2, and 220_3 running the instant messaging application.

The system 200 for evaluating a content may be configured to receive an input indicative of selection of a portion corresponding to at least one content that is included in the screen shared from the user terminals 220_1, 220_2, and 220_3 through the chat room of the instant messaging application. For example, when the user terminal 220_1 wants to share its own screen to receive an evaluation of at least one product content among a plurality of product contents included in the shared screen from the other user terminals 220_2 and 220_3 of the chat room, the user terminal 220_1 may select at least one product content. In response to an input indicative of selection of at least one content, the at least one content may be extracted, and the extracted at least one content may be provided to the system 200 for evaluating a content through the network 210.

The system 200 for evaluating a content may output the selected at least one content through the chat room of the instant messaging application operating on the plurality of user terminals 220_1, 220_2, and 220_3. According to an embodiment, the system 200 for evaluating a content may collect information associated with the selected at least one content, and output the information associated with the collected content together with the selected content through the chat room. According to another embodiment, an evaluation candidate list including at least one selected content may be automatically generated, and the generated evaluation candidate list may be shared through the chat room.

The system 200 for evaluating a content may receive evaluation of at least one content through the chat room of the instant messaging application operating on the plurality of user terminals 220_1, 220_2, and 220_3. According to an embodiment, when the screen is shared by the user terminal 220_1 and at least one content is selected and output, the evaluation on the at least one content output from the user of the other user terminals 220_2 and 220_3 may be received. According to another embodiment, when the screen is shared from the user terminal 220_1 and at least one content is selected and shared by the user terminal among the plurality of user terminals 220_1, 220_2, and 220_3, evaluation of the at least one content may be received from each of the plurality of user terminals 220_1, 220_2, and 220_3.

Figure 3:
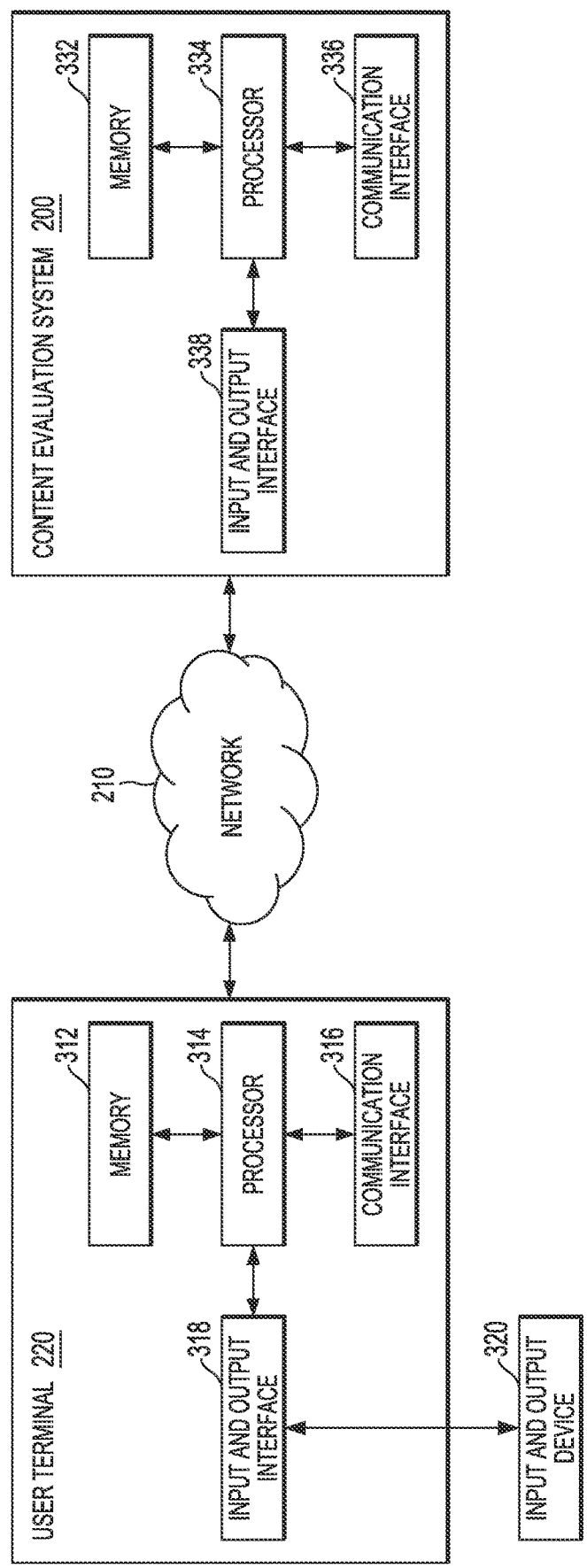
FIG. 3 is a block diagram illustrating an internal configuration of a user terminal and a system for evaluating a content according to an exemplary embodiment.

FIG. 3 is a block diagram illustrating the internal configuration of the user terminal 220 and the system 200 for evaluating a content according to an exemplary embodiment. The user terminal 220 may refer to any computing device that is capable of executing the instant messaging application and also capable of wired/wireless communication, and may include the mobile phone terminal 220_1, the tablet terminal 220_2, and the PC terminal 220_3 of FIG. 2, for example. As illustrated, the user terminal 220 may include a memory 312, a processor 314, a communication interface 316, and an input and output interface 318. Likewise, the system 200 for evaluating a content may include a memory 332, a processor 334, a communication interface 336, and an input and output interface 338. As illustrated in FIG. 3, the user terminal 220 and the system 200 for evaluating a content may be configured to communicate information and/or data through the network 210 using the respective communication modules 316 and 336. In addition, the input and output device 320 may be configured to input information and/or data to the user terminal 220 or to output information and/or data generated from the user terminal 220 through the input and output interface 318.

The memories 312 and 332 may include any non-transitory computer-readable recording medium. According to an embodiment, the memories 312 and 332 may include a permanent mass storage device such as random access memory (RAM), read only memory (ROM), disk drive, solid state drive (SSD), flash memory, and the like. As another example, a non-destructive mass storage device such as ROM, SSD, flash memory, disk drive, and the like may be included in the user terminal 220 or the system 200 for evaluating a content as a separate permanent storage device that is separate from the memory. In addition, an operating system and at least one program code (e.g., a code for the instant messaging application, and the like installed and driven in the user terminal 220) may be stored in the memories 312 and 332.

These software components may be loaded from a computer-readable recording medium separate from the memories 312 and 332. Such a separate computer-readable recording medium may include a recording medium directly connectable to the user terminal 220 and the system for evaluating a content 200, and may include a computer-readable recording medium such as a floppy drive, a disk, a tape, a DVD/CD-ROM drive, a memory card, and the like, for example. As another example, the software components may be loaded into the memories 312 and 332 through the communication modules rather than the computer-readable recording medium. For example, at least one program may be loaded into the memories 312 and 332 based on a computer program (for example, an application that provides instant messaging application services) installed by files provided by the developers or a file distribution system for distributing an installation file of the application through the network 210.

The processors 314 and 334 may be configured to process instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 220 and the system 200 for evaluating a content to communicate with each other through the network 210, and may provide a configuration or function for the user terminal 220 and/or the system 200 for evaluating a content to communicate with another user terminal or another system (e.g., a separate cloud system, a separate screen sharing support system, a content information provision system, and the like). For example, a request (e.g., a request to select content, a request to evaluate content) generated by the processor 314 of the user terminal 220 according to the program code stored in the recording device such as the memory 312 or the like may be transmitted to the system 200 for evaluating a content through the network 210 under the control of the communication interface 316. Conversely, a control signal or instructions provided under the control of the processor 334 of the system 200 for evaluating a content may be received by the user terminal 220 through the communication interface 316 of the user terminal 220 via the communication interface 336 and the network 210. For example, the user terminal 220 may receive at least one content selected through the communication interface 316 from the system 200 for evaluating a content and/or information associated with the selected at least one content.

The input and output interface 318 may be a means for interfacing with the input and output device 320. As an example, the input device may include a device such as a camera including an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 220 processes the instructions of the computer program loaded in the memory 312, a service screen or content, which is configured with the information and/or data provided by the system 200 for evaluating a content or other user terminals 220, may be displayed on the display through the input and output interface 318. While FIG. 3 illustrates that the input and output device 320 is not included in the user terminal 220, embodiment is not limited thereto, and the input and output device 320 may be configured as one device with the user terminal 220. In addition, the input and output interface 338 of the system 200 for evaluating a content may be a means for interfacing with a device for inputting or outputting, which may be connected to, or included in the system for evaluating a content 200. In FIG. 3, the input and output interfaces 318 and 338 are illustrated as the components configured separately from the processors 314 and 334, but are not limited thereto, and the input and output interfaces 318 and 338 may be configured to be included in the processors 314 and 334.

The user terminal 220 and the system 200 for evaluating a content may include more components than those illustrated in FIG. 3. According to an embodiment, the user terminal 220 may be implemented to include at least a part of the input and output devices 320 described above. In addition, the user terminal 220 may further include other components such as a transceiver, a global positioning system (GPS) module, a camera, various sensors, a database, and the like. For example, when the user terminal 220 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and the like are further included in the user terminal 220.

According to an embodiment, the processor 314 of the user terminal 220 may be configured to operate the instant messaging application or web browser application providing the instant messaging service including the service for evaluating a content. In this case, a program code associated with the application may be loaded into the memory 312 of the user terminal 220. While the application is running, the processor 314 of the user terminal 220 may receive information and/or data provided from the input and output device 320 through the input and output interface 318 or receive information and/or data from the system 200 for evaluating a content through the communication interface 316, and process the received information and/or data and store it in the memory 312. In addition, such information and/or data may be provided to the system 200 for evaluating a content through the communication interface 316.

While the instant messaging application is running, the processor 314 may receive texts, images, and the like, which may be inputted or selected through the input device 320 such as a touch screen, a keyboard, and the like connected to the input and output interface 318, and store the received texts, and/or images in the memory 312 or provide them to the system 200 for evaluating a content through the communication interface 316 and the network 210. For example, the processor 314 may receive a request for screen sharing service, information on content selection, information on content evaluation, and the like through an input device such as a touch screen or a keyboard. Accordingly, the received request and/or information may be provided to the system 200 for evaluating a content through the communication interface 316 and the network 210.

The processor 314 may receive, through the input device 320, an input indicative of selection of at least one content that is included in the screen shared through the chat room of the instant messaging application. In an example, the input indicative of the selection may include any operation of selecting at least one content that is included in the shared screen, for example, the input may include a touch input on a part corresponding to the content, adding to shopping cart, pinning, and the like, but is not limited thereto. According to an embodiment, the processor 314 may receive a selection for the first content included in the first screen shared through the chat room of the instant messaging application, through the input device 320 and the input and output interface 318. In addition, the processor 314 may receive a selection for the second content included in the second screen shared through the chat room of the instant messaging application, through the input device 320 and the input and output interface 318. In this example, following the first screen, the second screen may include a screen shared in the chat room. In response to the input, the processor 314 may extract at least one selected content and provide the extracted at least one content to the system 200 for evaluating a content through the communication interface 316.

According to an embodiment, the processor 314 may receive an evaluation candidate list including a plurality of contents from the system for evaluating a content 200, and receive an input for selecting one or more contents from among a plurality of contents included in the evaluation candidate list through the input device 320. The one or more contents selected in this way may be provided to the system 200 for evaluating a content and used for generating a final evaluation candidate list that includes one or more selected contents.

The processor 314 may receive, through the input device 320, an evaluation of at least one content selected through the chat room of the instant messaging application. According to an embodiment, when the selected at least one content is the first content, an input indicative of preference for the first content may be received through the input device 320. In addition, when the selected at least one content is a plurality of contents including the first content and the second content, the processor 314 may receive an input indicative of preference for at least one of the first content or the second content. For example, at least one of the first content and the second content may be selected from the evaluation candidate list that includes the first content and the second content. The received evaluation of the at least one content may be provided to the system 200 for evaluating a content through the communication interface 316.

The processor 314 may be configured to output the processed information and/or data through an output device such as a device capable of outputting a display (e.g., a touch screen, a display, and the like) of the user terminal 220 or a device capable of outputting an audio (e.g., a speaker). According to an embodiment, the information and/or data provided by the instant messaging application providing the service for evaluating a content may be displayed through the device capable of outputting a display, or the like. According to another embodiment, the information and/or data provided by the instant messaging application or web browser application may be output through the device capable of outputting an audio, or the like.

The processor 314 may receive a request to share a screen of another user terminal from the system 200 for evaluating a content, and display the screen shared through the chat room of the instant messaging application on the device capable of outputting a display of the user terminal 220. According to an embodiment, the shared screen may be configured to be displayed in at least a portion of the display of the user terminal 220 through the input and output interface 318. For example, the shared screen may be output to a background screen, top, side, bottom, and the like of the chat room displayed on the display. In addition, the processor 314 may display the shared screen in the chat room, while concurrently providing an interface through which the user of the user terminal 220 can chat with the other users participating in the chat room, or select and/or evaluate the content included in the shared screen.

The processor 314 may receive at least one content selected by another user terminal from the system 200 for evaluating a content, and output the received at least one content through the chat room of the instant messaging application displayed on the device capable of outputting a display. According to an embodiment, each time a content is selected on the shared screen, the processor 314 may receive the selected content through the communication interface 316 and output it through the chat room displayed on the display. In another embodiment, when selecting the plurality of contents on the shared screen is completed, the processor 314 may receive all the selected contents and output them at once.

The processor 314 may control the input and output interface 318 so that the device capable of outputting a display may display the received at least one content in at least a portion of the chat room of the instant messaging application. For example, when the user of the user terminal 220 presses or clicks a button or a link (e.g., a shopping cart icon, an evaluation (voting) icon, and the like) displayed in the chat room, at least one content on the display may be displayed. In an example, at least one content may be received from the system 200 for evaluating a content as an evaluation candidate list and/or a final evaluation candidate list, and shared through the chat room displayed on the display. The evaluation candidate list and/or final evaluation candidate list shared as described above may be accessed in real time for decision-making or evaluation on the content by a plurality of user accounts included in the chat room.

According to an embodiment, the processor 314 may receive not only the selected at least one content from the system for evaluating a content 200, but also the information associated with at least one content, and output the received content and information through the chat room of the instant messaging application displayed on the device capable of outputting a display. For example, when the at least one content is the first content, the first content and the information associated with the first content may be displayed together in the chat room. In addition, when the at least one content is selected together with the first content on the shared screen or includes the second content selected on the subsequently shared screen, the second content and the information associated with the second content may be output together in the displayed chat room.

The processor 314 may output a list including a plurality of contents selected by the system 200 for evaluating a content through the chat room of the instant messaging application displayed on the display in various forms. According to an embodiment, the processor 314 may receive a list including the selected plurality of contents in the form of a majority vote to which a plurality of users can respond. Accordingly, the user of the user terminal 220 may perform an input indicative of preference for at least one content among the plurality of contents included in the list. According to another embodiment, the processor 314 may receive a list in such a form that allows a simple vote (like or dislike) on least one content, and output the list through the chat room displayed on the display. In another embodiment, the processor 314 may receive the at least one content in the form of a message that does not require a response from the user and output it through the chat room displayed on the display.

The processor 314 may receive an evaluation of the at least one content from the system 200 for evaluating a content and display the received evaluation through a device capable of displaying. According to an embodiment, the processor 314 may receive a voting result for a plurality of contents included in the evaluation candidate list shared in the chat room, and share the received voting result through the chat room. In another embodiment, the processor 314 may receive at least one content evaluated so far and an evaluation history including the evaluation of the at least one content, and share the received evaluation history through the chat room.

The processor 334 of the system 200 for evaluating a content may be configured to manage, process, and/or store the information and/or data received from a plurality of user terminals including the user terminal 220 and/or a plurality of external systems. The information and/or data processed by the processor 334 may be provided to the user terminal 220 through the communication interface 336. For example, the processed information and/or data may be provided to the user terminal 220 in real time or may be provided later in the historical form. For example, the processor 334 may receive a request to share a screen from the user terminal 220 and provide the screen of the user terminal 220 to a terminal of another user account in the chat room so that the screen running on the user terminal 220 can be shared in the chat room.

According to an embodiment, the processor 334 may receive at least one content selected from the shared screen from the user terminal 220 and collect the information associated with the received at least one content. In an example, the information associated with the content may be any information that can represent or characterize the content, and may include, for example, a content image, a content name, a place of sale, a price, and the like, but is not limited thereto. According to an embodiment, the processor 334 may receive an image including the at least one content, and recognize and extract text representing or describing the at least one content from the received image. According to another embodiment, the processor 334 may receive the at least one content, and collect the information associated with the at least one content by using the at least one content on a network. The information collected in this way may be associated with the at least one content and provided to the user terminal 220. Alternatively, the information associated with the at least one content may be collected by extracting it from the screen shared by the processor 314 or searching on a network.

The processor 334 may be configured to receive at least one content selected from the shared screen from the user terminal 220 and generate a list including the received at least one content. According to an embodiment, when receiving the selected plurality of contents, the processor 334 may be configured to automatically generate an evaluation candidate list that includes the selected plurality of contents. According to another embodiment, when one or more contents selected from among a plurality of contents included in the evaluation candidate list are received, the processor 334 may generate a final evaluation candidate list that includes the selected one or more contents. The generated evaluation candidate list and/or the final evaluation candidate list may be provided to the user terminal 220 through the communication interface 336.

According to an embodiment, the processor 334 may output content information selected by the user or according to a preset evaluation method. In an example, the content information may include information on the user who has selected the corresponding content, information associated with the content, the number of selected contents, and a method for evaluating the content (e.g., real-time preference vote, majority vote, unanimous vote, and the like). The content information may be provided to the user terminal 220 through the communication interface 336 together with a list including at least one content.

The processor 334 may be configured to receive an evaluation of at least one content from the user terminal 220 and generate an evaluation result using the received evaluation. According to an embodiment, the processor 334 may be configured to receive evaluations for a plurality of contents included in the evaluation candidate list shared in the chat room and generate an evaluation result. For example, when an input for preference for a plurality of contents is received from a plurality of user accounts in the chat room, the processor 334 may process a result of the majority vote to generate a voting result, and further generate statistical data as an evaluation history. In an example, the voting result may include a result of a simple vote (like or dislike), a result of a majority vote, and the like. According to another embodiment, the processor 334 may be configured to receive evaluations for a plurality of contents shared in the chat room, and generate an evaluation history including the evaluation results received so far. The evaluation result and/or evaluation history generated in this way may be provided to the user terminal 220 through the communication interface 336.

Figure 4:
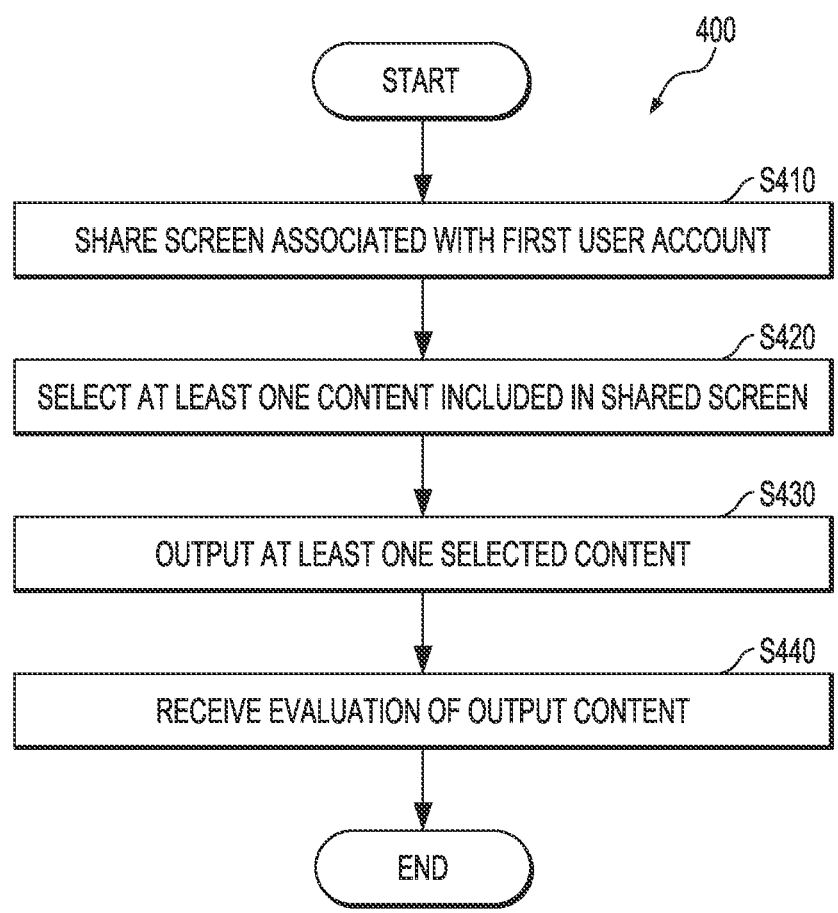
FIG. 4 is a flowchart illustrating a method for evaluating a content through an instant messaging application according to an exemplary embodiment.

FIG. 4 is a flowchart illustrating a method 400 for evaluating a content through the instant messaging application according to an exemplary embodiment. The method 400 for evaluating a content may be performed by the system for evaluating a content and/or the user terminal. In operation S410, the first user account of the user terminal 220 may join a chat room and may share a screen of the user terminal 220 through the chat room. In an example, one or more user accounts different from the first user account may participate in the chat room.

In operation S420, at least one content that is included in the shared screen may be selected. According to an embodiment, an input indicative of selection of the at least one content may be received from the first user account sharing the screen. In another embodiment, an input indicative of selection of the at least one content may be received from at least one user account among a plurality of user accounts included in the chat room.

In operation S430, the selected at least one content may be output through the chat room. In an example, the at least one content may be provided to a plurality of user accounts included in the chat room through a link associated with the chat room. In an embodiment, information associated with the at least one content may be output in the form of an evaluation candidate list and/or a final evaluation candidate list together with the selected at least one content.

In operation S440, an evaluation of the at least one content may be received from at least one user account among a plurality of accounts included in the chat room. According to an embodiment, an evaluation indicative of like or dislike for the one content may be received from the at least one user account. In another embodiment, an evaluation indicative of a preference for at least one content of the plurality of contents may be received from at least one user account.

Figure 5:
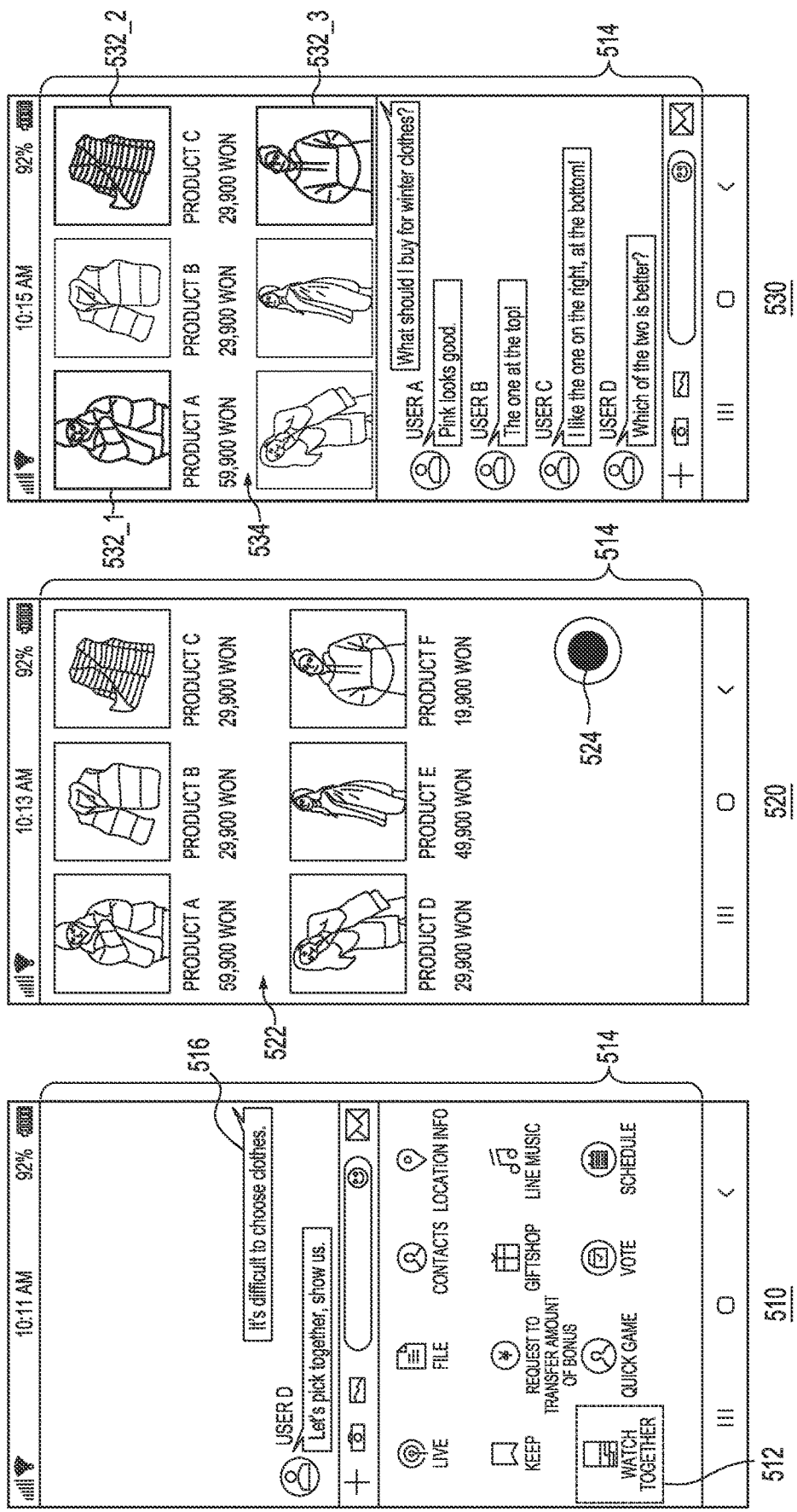
FIG. 5 is an exemplary diagram illustrating an operation of sharing a screen associated with a first user account in a chat room of an instant messaging application and selecting at least one content that is included in the shared screen, according to an exemplary embodiment.

FIG. 5 is an exemplary diagram illustrating an operation of sharing a screen associated with a first user account 516 in a chat room 514 of an instant messaging application and selecting at least one content that is included in the shared screen 534, according to an exemplary embodiment. In an example, the first user account and other user accounts may be included or participating in the chat room 514. Operations 510, 520, and 530 may be performed by using the chat room 514 that is displayed on the user terminal 220 on which the first user account is logged in.

A screen associated with the first user account may be shared in the chat room where the first user account of the instant messaging application is included. To this end, the first user account may perform an input indicating screen sharing in the chat room 514. For example, as illustrated in operation 510, an icon for screen sharing, that is, a "Watch Together" icon 512 located at the bottom of the chat room 514 may be touched and selected. In operation 510, the "Watch Together" icon 512 located at the bottom of the chat room 514 is used for the screen sharing, but embodiment is not limited thereto, and accordingly, any link or icon capable of executing screen sharing of the chat room 514 may be placed at any location in the chat room 514.

An input indicative of screen sharing by the first user account may be received in the chat room, and a screen associated with the first user account may be displayed in at least a portion of the chat room. According to an embodiment, when the "Watch Together" icon 512 displayed in operation 510 is touched, an interface for sharing any application or program executed in the user terminal 220 on which the first user account is logged in or signed in, may be displayed on the instant messaging application. For example, as illustrated in operation 520, a screen including a shopping page 522 in a shopping application or a web browser which is running on the user terminal 220 may be displayed on the instant messaging application, and a screen share icon 524 may be displayed at the bottom of the screen. In operation 520, when the screen share icon 524 is touched, the screen including the shopping page 522 may be output through at least a portion of the chat room 514. Operation 520 may be performed without exiting the instant messaging application or switching from the instant messaging application to the shopping application or the web browser. FIG. 5 illustrates that before sharing the screen of the user terminal 220 with other chat room participants, the instant messaging application executes an intermediate process of confirming the screen to be shared by the first user account through operation 520, but the present disclosure is not limited thereto. When the "Watch Together" icon 512 is touched, an application or program executed in the first user account may be directly shared in the chat room 514 without going through the intermediate process (e.g., operation 520).

At least one content that is included in the shared screen 534 may be output through the chat room 514. According to an embodiment, a screen including the shopping page 522 may be shared in the chat room 514, and at least one content of a plurality of contents included in the sharing screen 534 may be selected. As illustrated in operation 530, the shared screen 534 may be displayed on the background screen of the chat room 514.

In operation 530, the processor 314 of the user terminal 220 or the processor 334 of the content evaluation system 200 may detect graphic objects (e.g., images of product A to product F) in the shared screen 534 of the chat room 514, and may change the graphic objects to a selectable state so at least one content (e.g., at least one of the graphic objects) included in the shared screen 534 may be selected by any chat participant of the chat room 514 (e.g., any user account included in the chat room 514). According to an embodiment, the first user account may select at least one content that is included in the shopping page 522. To this end, an input (e.g., a touch input or the like) indicative of selection of a portion corresponding to the at least one content that is included in the shopping page 522 may be received. For example, as illustrated in operation 530, a touch input for a portion 532_1 corresponding to a product A content, a portion 532_2 corresponding to a product C content, and a portion 532_3 corresponding to a product F content, which are included in the shared screen 534, may be received. FIG. 5 illustrates that the first user account of the chat room 514 selects at least one content that is included in the shared screen 534, but the present disclosure is not limited thereto, and it may be configured such that another user account of the chat room 514 may select at least one content that is included in the shared screen 534.

A portion corresponding to each of a plurality of contents included in the shared screen, which can be selected by a user account, may be separated and analyzed by various methods. According to an embodiment, the portion 532_1 corresponding to the product A content, the portion 532_2 corresponding to the product C content, and the portion 532_3 corresponding to the product F content included in the shared screen 534 may be specified by a page structure set for the shopping page 522. This page structure may include a structure in which portions corresponding to each of a plurality of contents in the shopping page 522 are defined by a system that provides the shopping page 522. In another embodiment, the portion 532_1 corresponding to the product A content, the portion 532_2 corresponding to the product C content, and the portion 532_3 corresponding to the product F content included in the shared screen 534 may be specified through image recognition processing by the user terminal or the system for evaluating a content. For example, the processor 314 of the user terminal 220 running the instant messaging application may analyze the image including the shopping page 522, that is, the shared screen, to separate and recognize the portions corresponding to each of a plurality of contents included in the shopping page 522. As another example, the processor 334 of the content evaluation system 200 may receive the image including the shopping page 522, that is, the screen shared from the user terminal 220, and analyze the received image to separate and recognize the portions corresponding to each of a plurality of contents included in the shopping page 522.

Figure 6:
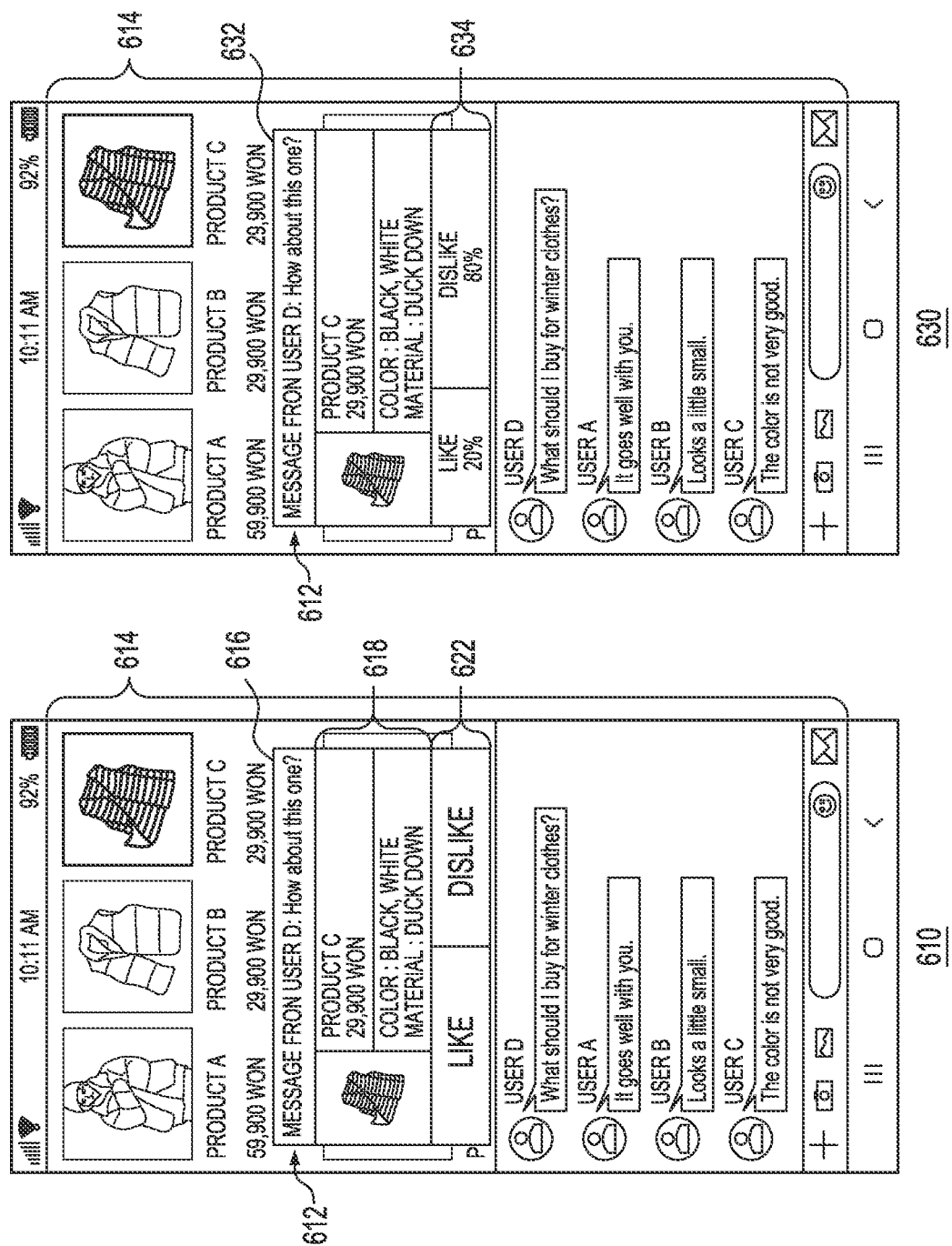
FIG. 6 is an exemplary diagram illustrating an operation of outputting at least one content that is selected in a chat room of an instant messaging application, and outputting an evaluation result for the at least one content through the chat room according to an exemplary embodiment.

FIG. 6 is an exemplary diagram illustrating an operation of outputting at least one content that is selected in the chat room 614 of the instant messaging application, and outputting an evaluation result for the at least one content through the chat room 614 according to an exemplary embodiment. In an exemplary embodiment, as illustrated in operation 610, a plurality of user accounts or users are included or participating in the chat room 614, and may exchange text messages with each other through the chat room 614. In addition, the screen may be shared from any user account included in the chat room 614. For example, the shared screen 612 may be shared in the chat room by user D.

The first content included in the screen shared in the chat room may be selected, and the selected first content may be output through the chat room. In operation 610, the user account D may select the product C content on the shared screen 612 including the shopping page, and a message including the selected product C content may be output through the chat room 614. In an example, the message 616 may include not only the selected product C content, but also information 618 associated with the product C content. For example, the information 618 associated with the product C content may include a text recognized in association with the product C from the shared screen 612, that is, "product C" which is the name of the product C, and "29,900 won" which is the price of the product C. In addition, the user terminal 220 or the content evaluation system 200 may search for information associated with the product C via the network 210, based on information extracted in association with the product C content from the shared screen 612, that is, using at least one of the image of the product C, the name of the product, and the price of the product C. In this embodiment, the color information "color: black, white" and the material information "material: duck down" of the product C content may be searched in association with the product C content, and included in the message 616. In addition, the message 616 may include an area 622 in which an input indicative of preference for the selected product C content may be input. When the message 616 including the product C content is output to the chat room 614, at least one user account among the plurality of user accounts included in the chat room 614 may select the "Like" or "Dislike" icon included in the area 622 included in the message 616 to perform evaluation on the product C content. As another example, at least one user account among a plurality of user accounts included in the chat room 614 may input a comment in association with the area 622 included in the message 616.

The result of the evaluation of the content performed from at least one user account may be output through the chat room. According to an embodiment, when a user account included in the chat room 614 performs evaluation on the product C content, a message 632 including the evaluation result of the product C content may be displayed through the chat room 614. For example, the message 632 may include percentage information 634 for the evaluation of a plurality of respondent user accounts included in the chat room 614. In the operation 630, it is illustrated that the evaluation result is displayed as the percentage information, but the present disclosure is not limited thereto, and various information such as the number of evaluators and the name of the evaluator for each preference may be included in the evaluation result. In addition, the percentage information 634 may show the percentage (e.g., 20%) of users who selected the "Like" icon and the percentage (e.g., 80%) of users who selected the "Dislike" icon. The comment input in association with the area 622 included in the message 616 may be analyzed, and the evaluation result may be displayed based on the analysis result.

Figure 7:
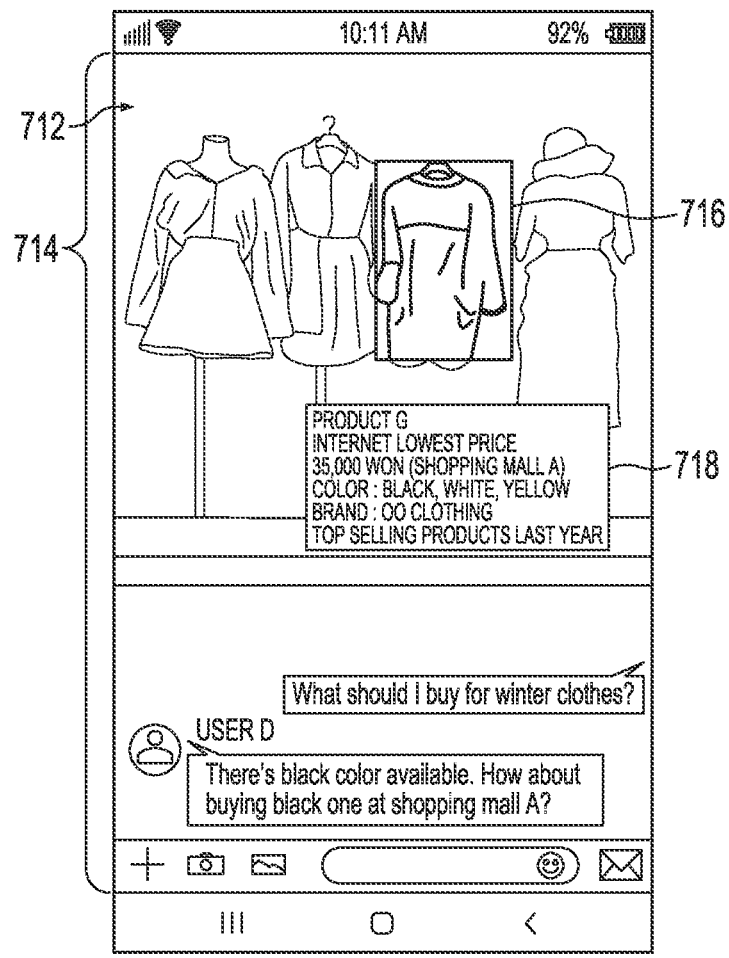
FIG. 7 is an exemplary view illustrating an operation of sharing a video captured through an image sensor associated with a first user account in a chat room and outputting at least one content selected from a screen that includes the shared video according to an exemplary embodiment.

FIG. 7 is an exemplary view illustrating an operation of sharing a video captured through an image sensor associated with a first user account in a chat room 714 and outputting at least one content selected from a screen 712 that includes the shared video according to an exemplary embodiment. The operation illustrated in FIG. 7 may be performed by the user terminal 220 on which the first user account is logged in. The user terminal 200 may execute the instant messaging application and display the chat room 714 to perform the operation. A video may be taken or captured through an image sensor (e.g., a camera) mounted in the user terminal 220, and may be displayed through the chat room 714 to be shared with other chat room participants. For example, the captured video described above may be shared during a video call between the first user account and one or more other user accounts included in the chat room 714. FIG. 7 illustrates that a plurality of user accounts included in the chat room 714 exchange chats with each other using text while a video captured is shared in the chat room 714, but the present disclosure is not limited thereto, and a video captured without a text chat window may be shared during the video call.

At least one content that is included in the screen including the shared video may be selected. According to an embodiment, a portion 716 corresponding to a product G content included in the screen 712 where the shared video is included, may be selected. As illustrated in the shared screen 712, the product G content may be selected by any user account that is conducting a video call through the chat room 714. For example, by touching the portion 716 corresponding to the product G content on the shared screen 712, the portion corresponding to the G product may be selected. When the portion 716 corresponding to the product G content is selected on the shared screen 712, the product G content corresponding to the selected portion may be extracted in the shared screen 712.

Information associated with the selected at least one content may be output to the chat room together with the selected at least one content. According to an embodiment, information 718 associated with the selected product G content may be displayed together with the product G content in the chat room 714. For example, the information 718 associated with the product G content may include information that may indicate or characterize the product G content searched on a network using the product G content. As illustrated, the information 718 associated with the product G content may include a price, place of sale, color, or brand of the G product, and a ranking of last year's sales of the product. The information associated with the product G content may be referenced to by the user account in a video call with the first user account, to evaluate the product G content through the chat room 714.

Figure 8:
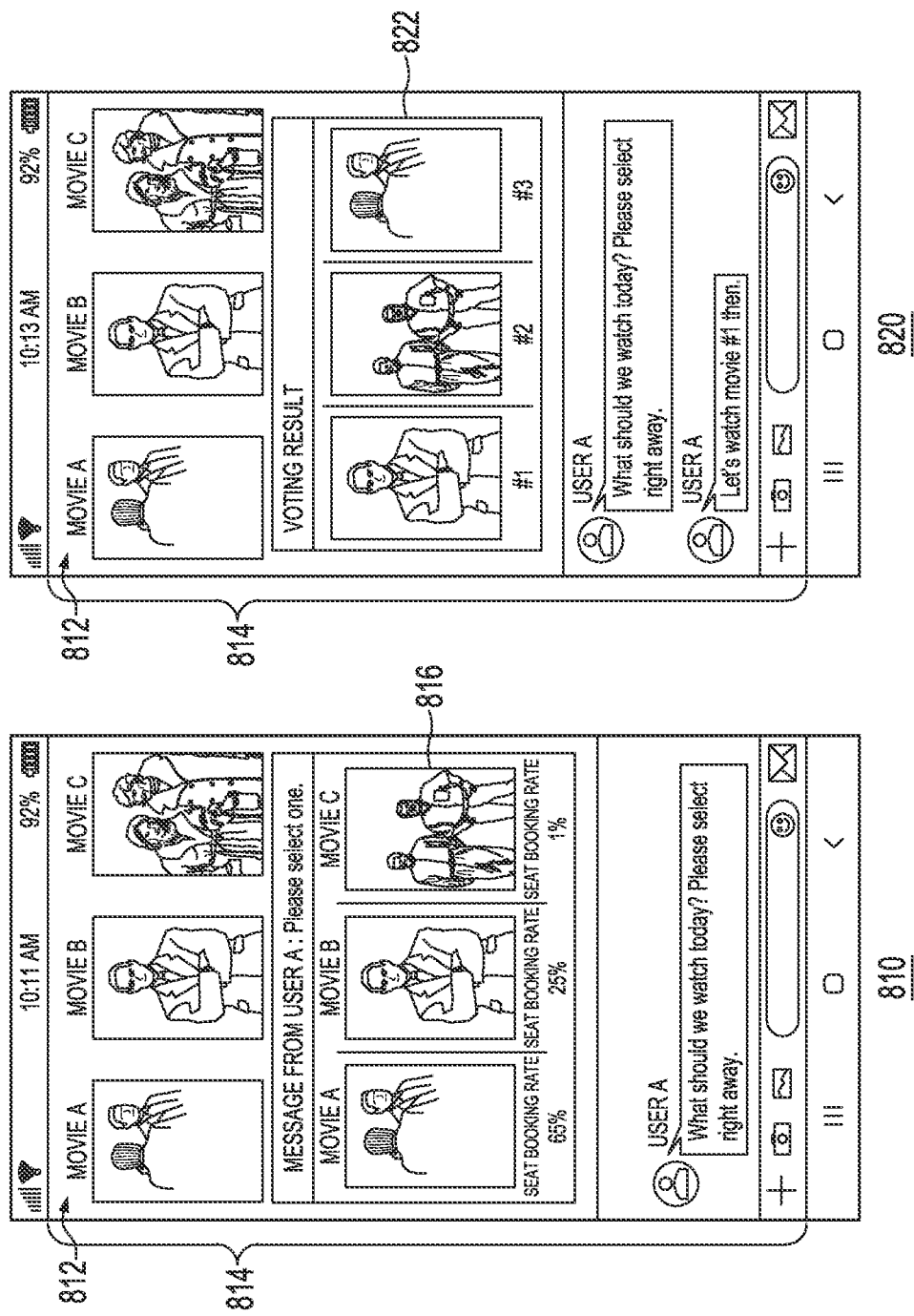
FIG. 8 is an exemplary diagram illustrating an operation of outputting an evaluation candidate list including a plurality of contents selected from a screen shared through a chat room of an instant messaging application, and outputting a voting result for the plurality of contents through the chat room according to an exemplary embodiment.

FIG. 8 is an exemplary diagram illustrating an operation of outputting an evaluation candidate list including a plurality of contents selected from a screen 812 shared through a chat room 814 of the instant messaging application, and outputting a voting result for the plurality of contents through the chat room 814 according to an exemplary embodiment. According to an embodiment, any user account included in the chat room 814 may share a screen associated with itself to the chat room. For example, as illustrated in operation 810, the user account A included in the chat room 814 may share the screen 812 including a movie content page running on the its terminal on the top of the chat room 814.

When a plurality of contents are selected on the screen shared through the chat room, an evaluation candidate list including a plurality of contents may be automatically generated and shared through the chat room. According to an embodiment, when a user A included in the chat room 814 selects movie A content, movie B content, and movie C content on the screen 812 including a movie content page, an evaluation candidate list 816 including the movie A content, the movie B content, and the movie C content may be automatically generated. The evaluation candidate list 816 may include a movie content image displayed on the shared screen and titles of respective movies, as well as seat booking rates for each movie searched from a movie booking system that is accessible on the network. In addition, the evaluation candidate list 816 may include a text message "Please select one", which is a message sent by user A, so that another user account in the chat room is guided to select one movie content from among a plurality of movie contents. The generated evaluation candidate list 816 may be shared through the chat room 814. As illustrated operation 810, a text message "What should we watch today? Please select right away" associated with the evaluation candidate list 816 may be shared with another user account through the chat room 814, and referenced to by another user account when selecting movie content in the evaluation candidate list 816.

A voting result for a plurality of contents may be generated based on the preferences for a plurality of contents included in the evaluation candidate list selected by a plurality of user accounts included in the chat room, and shared through the chat room. According to an embodiment, as illustrated in operation 820, an evaluation result 822 including a preference ranking for a plurality of movie contents may be shared through the chat room 814. In operation 820, while it is illustrated that the user account in the chat room 814 that has performed the evaluation of the target content without selecting the target content is also given an access to the evaluation result for the plurality of movie contents, the embodiment is not limited thereto, and the evaluation result may be disclosed only to the user account (In this embodiment, "user A") that selected the content on the shared screen.

Figure 9:
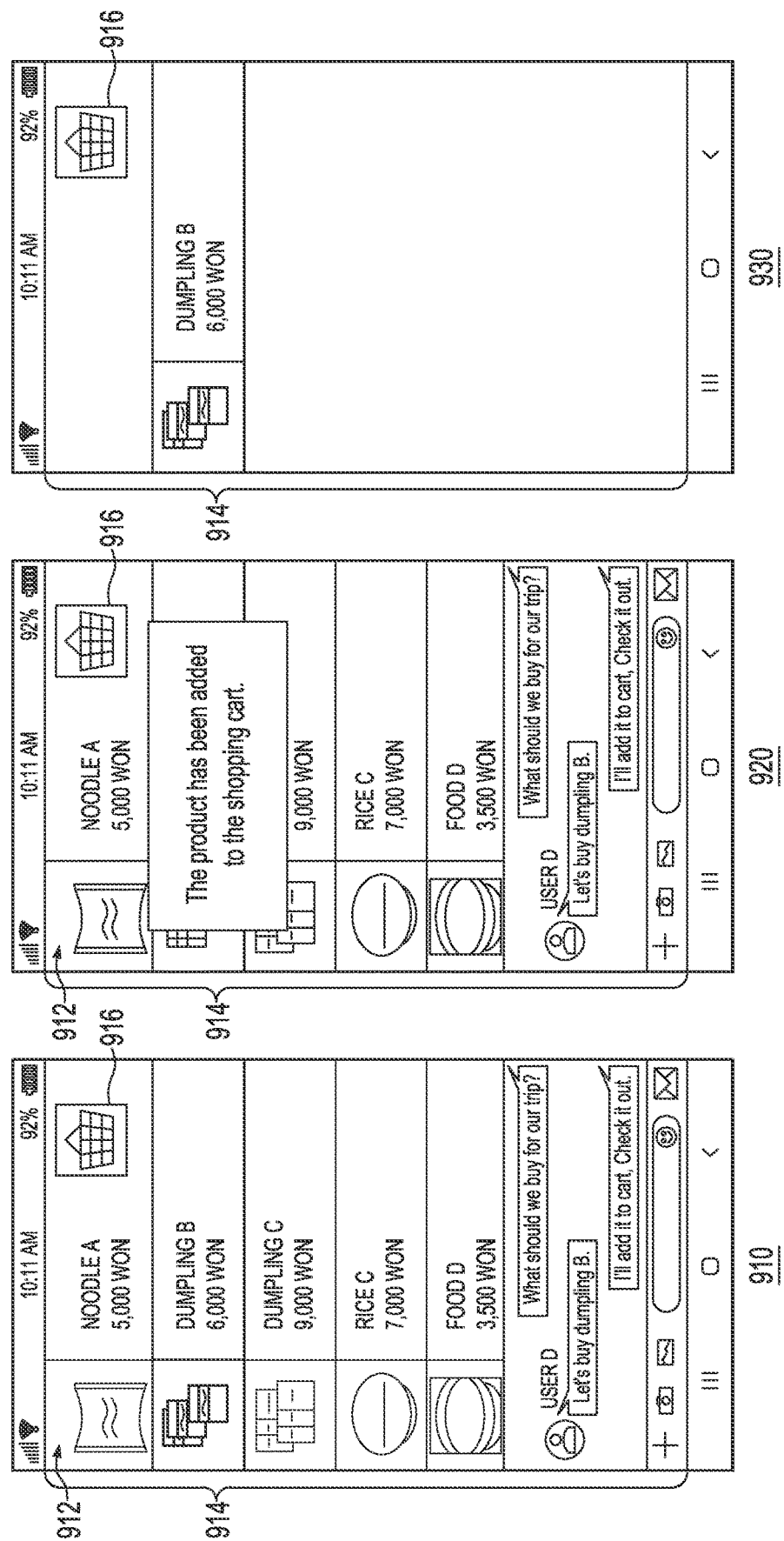
FIG. 9 is an exemplary diagram illustrating an operation of a first user account included in a chat room, in which the operation is to share a screen associated with the first user account and select at least one content that is included in the shared screen according to an exemplary embodiment.

FIG. 9 is an exemplary diagram illustrating an operation of a first user account included in a chat room, in which the operation is to share a screen associated with the first user account and select at least one content that is included in the shared screen according to an exemplary embodiment. According to an embodiment, in operation 910, a first user account included in a chat room 914 may share a screen 912 displayed by a shopping application running on its user terminal 220 through the chat room 914. The shared screen 912 includes a plurality of product contents, and the first user account may select dumpling B content from among a plurality of product contents. For example, as illustrated in operation 910, the first user account may exchange text messages with a user D, which is another user account in the chat room 914, in connection with the selection of the dumpling B content.

When at least one content is selected on the shared screen 912, the selected at least one content may be output through the chat room 914. According to an embodiment, when the first user account touches a shopping cart icon 916 after selecting the dumpling B content, the dumpling B content may be stored in the shopping information system. For example, as illustrated in operation 920, when the dumpling B content is selected, a text message "The product has been added to the shopping cart" may be displayed in the chat room 914. Then, when the shopping cart icon 916 is touched, the product content that has been selected so far may be displayed through the chat room 914. For example, as illustrated in operation 930, the selected dumpling B content may be output through the chat room 914. Accordingly, as illustrated in operation 920 and operation 930, a plurality of user accounts included in the chat room 914 may access the product content selected by the first user account so far through the shopping cart icon 916 and communicate opinions or perform evaluation of the selected product content in real time.

Figure 10:
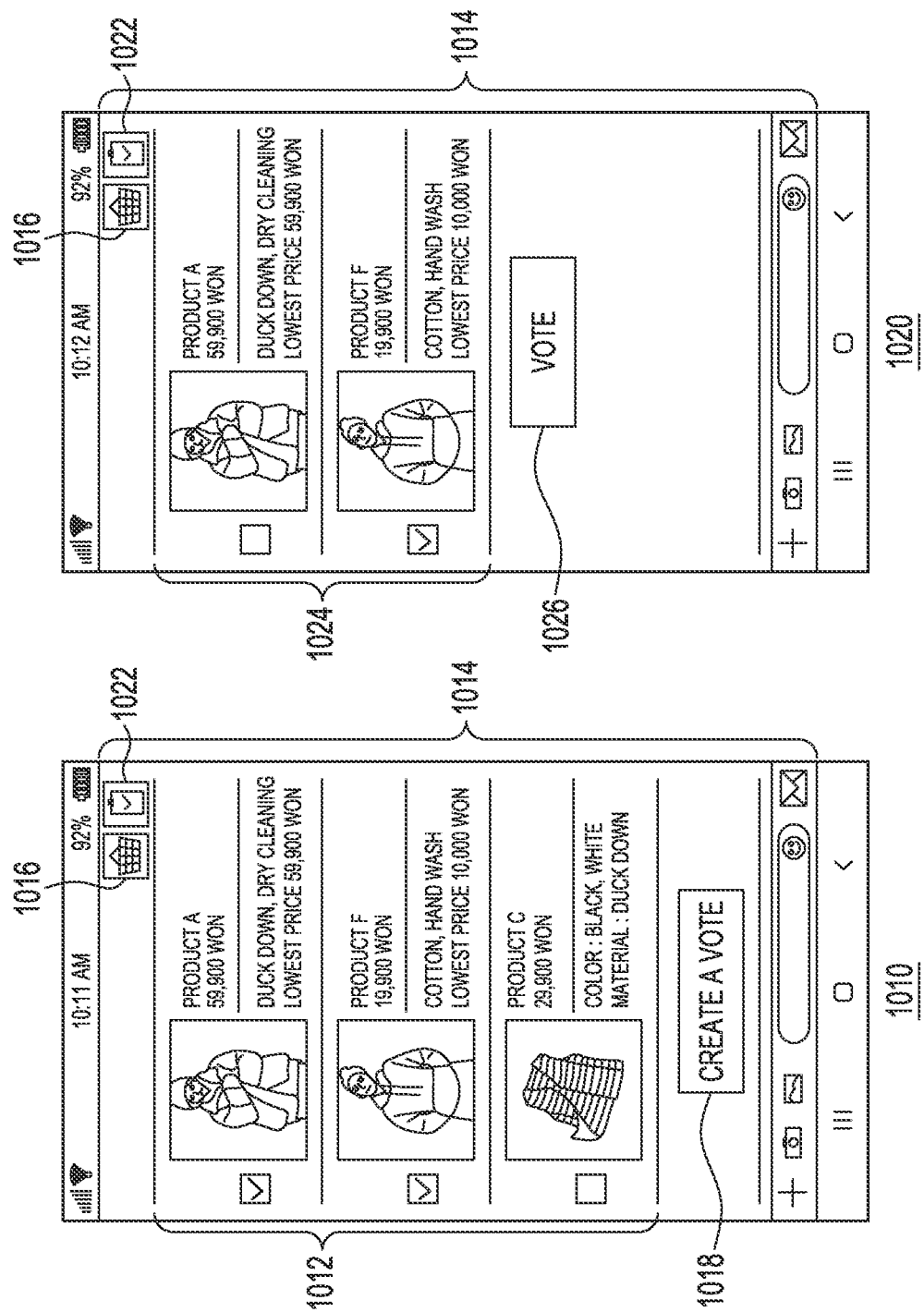
FIG. 10 is an exemplary diagram illustrating an operation of selecting one or more contents from among a plurality of contents included in an evaluation candidate list, generating a final evaluation candidate list including the selected one or more contents, and sharing the generated result through a chat room according to an exemplary embodiment.

FIG. 10 is an exemplary diagram illustrating an operation of selecting one or more contents from among a plurality of contents included in an evaluation candidate list 1012, generating a final evaluation candidate list 1024 including the selected one or more contents, and sharing the generated result through a chat room according to an exemplary embodiment. According to an embodiment, as illustrated in operation 1010, the evaluation candidate list 1012 may include a plurality of product contents. The plurality of product contents may be selected by at least one user account included in a chat room 1014. For example, when a shopping cart icon 1016 is touched in the chat room 1014, the evaluation candidate list 1012 may be shared through the chat room 1014.

One or more contents may be selected from among a plurality of contents included in the evaluation candidate list, and a final evaluation candidate list including the selected one or more contents may be generated. According to an embodiment, among product A content, product F content, and product C content included in the evaluation candidate list 1012 output through the chat room 1014, the product A content and the product F content may be selected. For example, as illustrated in operation 1010, check boxes corresponding to each of the product A content and the product F content may be checked, and a "vote generation" button 1018 disposed at the bottom of the chat room 1014 may be touched, so that product A content and product F content may be selected. The selected product A content and the product F content may be used to generate the final evaluation candidate list 1024.

The final evaluation candidate list including one or more contents selected from the evaluation candidate list may be shared through the chat room 1014. As illustrated in operation 1020, the final evaluation candidate list 1024 including the product A content and the product F content may be shared through the chat room 1014. For example, when a vote icon 1022 disposed on the top of the chat room 1014 is touched or selected by at least one user account included in the chat room 1014, as illustrated in operation 1020, the final evaluation candidate list 1024 may be output through the chat room 1014. At least one user account may select at least some contents from among a plurality of contents included in the output final evaluation candidate list 1024. For example, at least one user account may evaluate the contents included in the final evaluation candidate list 1024, by checking the check box corresponding to the product A content included in the final evaluation candidate list 1024 and pressing a "vote" button 1026.

Figure 11:
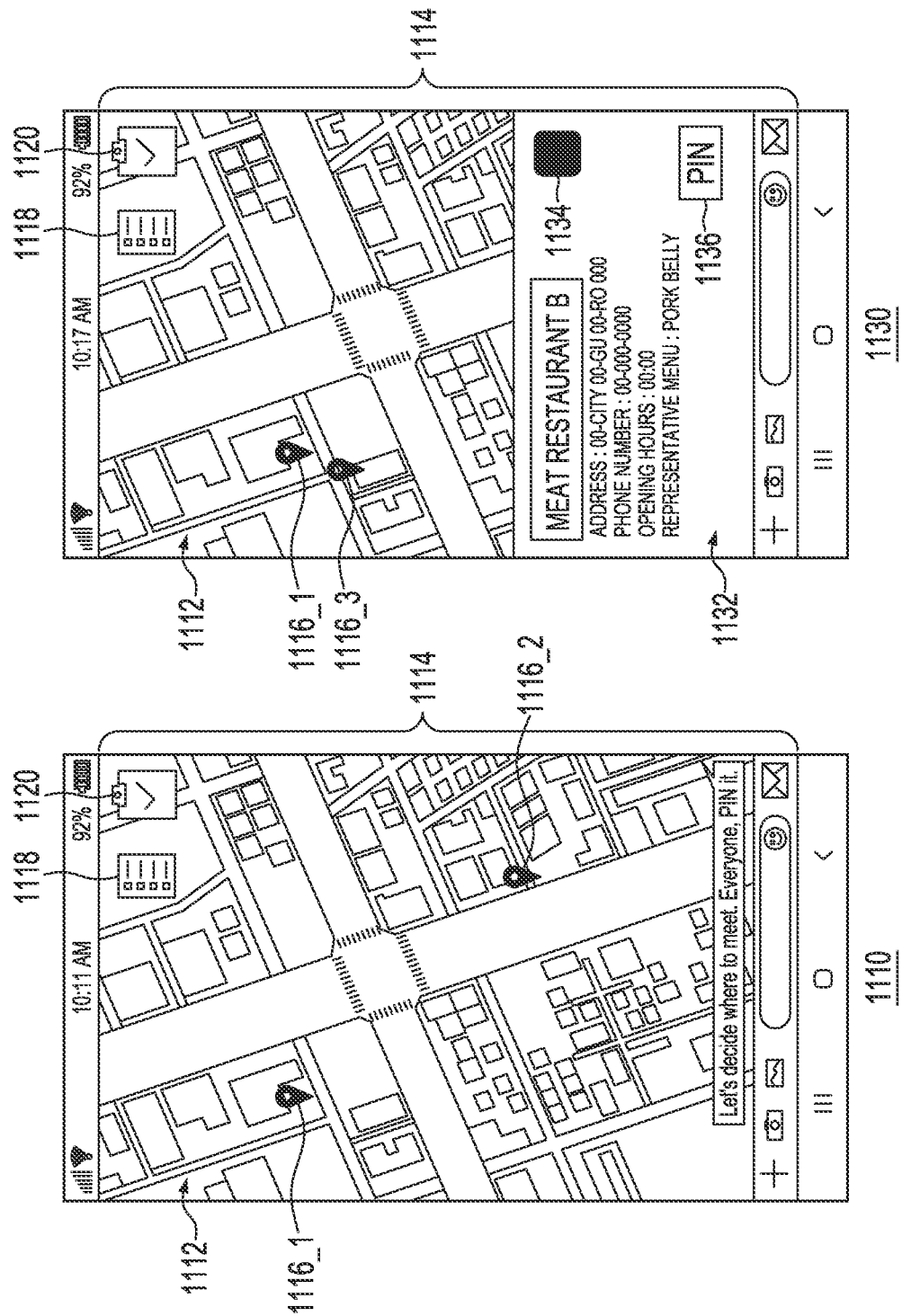
FIG. 11 is an exemplary diagram illustrating an operation of selecting a portion corresponding to a content on a screen shared through a chat room through pinning according to an exemplary embodiment.

FIG. 11 is an exemplary diagram illustrating an operation of selecting a portion corresponding to a content on a screen shared through a chat room 1114 through pinning according to an exemplary embodiment. According to an embodiment, a screen 1112 displayed by a map application through the first user account included in the chat room 1114 may be shared through the chat room 1114. In an example, the first user account may be an account associated with a user who is conducting an operation 1110 on his or her user terminal 220. The shared screen 1112 may include a plurality of place contents. The operation 1110 shows the state in which a first place content 1116_1 and a second place content 1116_2 are selected through pinning on the shared screen 1112.

An input indicative of selection of a portion corresponding to at least one place content among a plurality of place contents included in the shared screen may be received, and at least one place content corresponding to the selected portion may be selected. According to an embodiment, at least one place content may be selected from the shared screen 1112 displaying a map of a specific area. As illustrated in operation 1130, a portion representing a third place content 1116_3 may be selected by the first user account. For example, the first user account may select the third place content 1116_3 by touching a portion representing the third place content 1116_3 and touching a pining icon 1118. In this process, when the pining icon 1118 is touched, information 1132 associated with the third place content 1116_3 may be displayed through the chat room. This information 1132 may include the name, address, phone number, business hours, representative menu, and the like of the third place, and may include a pining button 1136 for completing the selection of the third place content 1116_3 through pinning. In addition, a button 1134 for changing the color of the portion representing the third place content 1116_3 in the map displayed on the shared screen may be provided in the information 1132 associated with the third place content 1116_3. At least one place content selected in this way may be the subject of evaluation by at least one user account in the chat room, and the subject of evaluation may be confirmed through a vote icon 1120.

Figure 12:
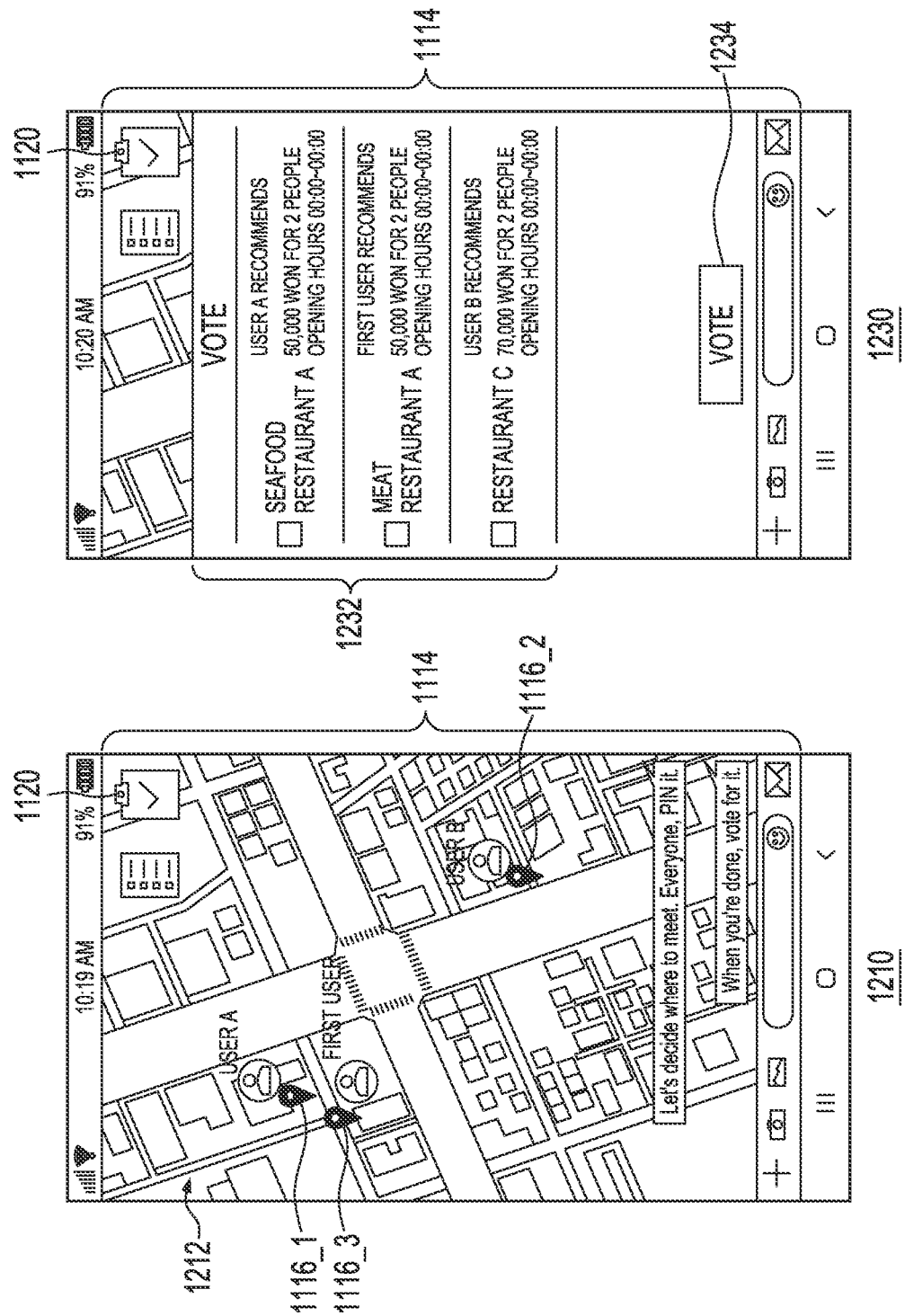
FIG. 12 is an exemplary diagram illustrating an operation of automatically generating an evaluation candidate list including the selected content, when one or more contents are selected on the screen shared through the chat room 1114 according to an exemplary embodiment.

FIG. 12 is an exemplary diagram illustrating an operation of automatically generating an evaluation candidate list including the selected content, when one or more contents are selected on the screen shared through the chat room 1114 according to an exemplary embodiment. According to an embodiment, as illustrated in a screen 1212 shared in operation 1210, the first place content 1116_1 may be selected by the user account A, the second place content 1116_2 may be selected by the user account B, and the third place content 1116_3 may be selected by the first user account. In an example, the user account A, the user account B, and the first user account may be included or participating in the chat room 1114. When the first place content 1116_1, the second place content 1116_2, and the third place content 1116_3 are selected on the shared screen 1212, an evaluation candidate list including these contents may be automatically generated.

The evaluation candidate list may be provided to a plurality of user accounts included in the chat room through a link associated with the chat room. According to an embodiment, when the vote icon 1120 is selected, as illustrated in operation 1230, an evaluation candidate list 1232 including the first place content 1116_1, the second place content 1116_2, and the third place content 1116_3 selected on the shared screen 1212 may be displayed. In an example, the evaluation candidate list 1232 may include information (e.g., name, recommending user, price range, business hours, and the like) associated with the first place content 1116_1, the second place content 1116_2, and the third place content 1116_3. A plurality of user accounts included in the chat room 1114 may select one content from among a plurality of contents included in the evaluation candidate list 1232. For example, by checking a check box corresponding to a plurality of contents included in the evaluation candidate list 1232 and clicking a "vote" button 1234, the evaluation of a plurality of contents included in the evaluation candidate list 1232 may be performed in real time.

The method for evaluating a content described above may be implemented as a computer-readable code on a computer-readable recording medium. The computer readable recording medium includes all kinds of recording devices in which data readable by a computer system is stored. Examples of computer readable recording medium include ROM, RAM, CD-ROM, magnetic tape, floppy disks, and optical data storage devices, and the like. In addition, the computer readable recording medium may be distributed over network coupled computer systems so that the computer readable code is stored and executed in a distributed manner. Further, programmers in the technical field pertinent to the present disclosure will be easily able to envision functional programs, codes and code segments to implement the embodiments.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer readable medium as one or more instructions or codes, or may be transmitted through a computer readable medium. The computer readable media include both the computer storage media and the communication media including any medium that facilitates the transfer of a computer program from one place to another. The storage media may also be any available media that may be accessed by a computer. By way of non-limiting example, such a computer readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer readable media.

The software module may reside in, RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for evaluating a content through an instant messaging application performed by at least one processor, the method comprising:
    sharing a screen of a user terminal associated with a first user account, through a chat room of the instant messaging application in which a plurality of user accounts comprising the first user account participate, in response to receiving, from the first user account, an input that shares the screen in the chat room, wherein the screen is shared on a background screen of the chat room or in at least a portion of the chat room;
    selecting at least one content that is included in the shared screen;
    collecting information associated with the selected at least one content;
    outputting the selected at least one content and the collected information associated with the at least one content together with a first input option and a second input option in a chat room associated screen;
    receiving, through the chat room, an evaluation of the at least one content from at least one user account among the plurality of user accounts;
    receiving an input in the chat room associated screen that selects one of the first input option and the second input option from at least one user account; and
    outputting a result based on the input received from each of the at least one user account;
    wherein the selecting the at least one content comprises receiving an input that selects at least one portion on the shared screen, corresponding to the at least one content from among a plurality of contents included in the shared screen, and
    a portion corresponding to each of the plurality of contents included in the shared screen is specified by a pre-defined structure set associated with a shared page displayed on the shared screen.

2. The method of claim 1, wherein the selecting the at least one content further comprises:
    extracting the at least one content based on a position of the at least one portion on the shared screen.

3. The method of claim 1, wherein the receiving the input that selects the at least one portion comprises receiving the input that selects the at least one portion from the at least one user account among the plurality of user accounts that participate in the chat room.

4. The method of claim 1, wherein the shared screen is a first shared screen, and the selected at least one content is a first content included in the first shared screen, and
    the outputting the selected at least one content comprises outputting the first content and the information associated with the first content together.

5. The method of claim 4, wherein the receiving the evaluation of the at least one content comprises receiving, from the at least one user account, a second input indicative of preferences of the plurality of user accounts for the first content over one or more other contents included in the shared screen.

6. The method of claim 4, wherein the selecting the at least one content further comprises selecting a second content included in a second shared screen that is displayed through the chat room subsequent to the first shared screen, and
    the outputting the selected at least one content comprises outputting the selected second content and the information associated with the second content together.

7. The method of claim 6, wherein the receiving the evaluation of the at least one content comprises receiving, from the at least one user account, a third input indicative of preferences of the plurality of user accounts for at least one of the first content or the second content over one or more other contents included in the shared screen.

8. The method of claim 1, wherein the collecting the information associated with the selected at least one content comprises recognizing a text associated with the at least one content on the shared screen.

9. The method of claim 1, wherein the collecting the information associated with the selected at least one content comprises searching for the information associated with the at least one content using the selected at least one content on a network.

10. The method of claim 1, wherein the sharing the screen comprises sharing a video that is captured by a camera of the user terminal, through the chat room, during a video call between the plurality of user accounts.

11. The method of claim 1, wherein the outputting the selected at least one content comprises:
when a plurality of contents are selected on the shared screen, automatically generating an evaluation candidate list comprising the selected plurality of contents; and
sharing the generated evaluation candidate list through the chat room.

12. The method of claim 11, further comprising:
selecting one or more contents from among the plurality of contents included in the evaluation candidate list; and
generating a final evaluation candidate list comprising the selected one or more contents, wherein the sharing the generated evaluation candidate list through the chat room comprises sharing the final evaluation candidate list in the chat room.

13. The method of claim 11, wherein the receiving the evaluation of the at least one content comprises receiving a voting result for the plurality of contents included in the evaluation candidate list shared in the chat room, and
the method for evaluating the content further comprises sharing the voting result for the plurality of contents through the chat room.

14. The method of claim 11, wherein the sharing the generated evaluation candidate list through the chat room comprises providing to the plurality of user accounts included in the chat room through a link associated with the chat room.

15. The method of claim 1, further comprising providing an evaluation history comprising the selected at least one content and the received evaluation of the at least one content through the chat room.

16. A non-transitory computer-readable recording medium storing instructions for executing the method for evaluating the content according to claim 1.

17. A system for evaluating a content through an instant messaging application, comprising:
a communication interface;
a memory configured to store computer readable instructions; and
at least one processor configured to execute the computer readable instructions to:
control the communication interface to share a screen of a user terminal associated with a first user account, through a chat room of the instant messaging application in which a plurality of user accounts comprising the first user account participate, in response to receiving, from the first user account, an input that shares the screen in the chat room, wherein the screen is shared on a background screen of the chat room or in at least a portion of the chat room;
select at least one content that is included in the shared screen;
collect information associated with the selected at least one content;
output the selected at least one content and the collected information associated with the at least one content together with a first input option and a second input option in a chat room associated screen; and
control the communication interface to:
receive, from at least one user account, an evaluation of the at least one content among the plurality of user accounts;
receive an input in the chat room associated screen that selects one of the first input option and the second input option from at least one user account; and
output a result based on the input received from each of the at least one user account,
wherein the selecting the at least one content comprises receiving an input that selects at least one portion corresponding to the at least one content from among a plurality of contents included in the shared screen, and a portion corresponding to each of the plurality of contents included in the shared screen is specified by a pre-defined structure set associated with a shared page displayed on the shared screen.

18. The system of claim 17, wherein the at least one processor is further configured to collect information associated with the selected at least one content, and output the selected at least one content and the collected information associated with the at least one content together.

* * * * *